(12) United States Patent
Ono

(10) Patent No.: US 8,199,246 B2
(45) Date of Patent: Jun. 12, 2012

(54) IMAGE CAPTURING APPARATUS, IMAGE CAPTURING METHOD, AND COMPUTER READABLE MEDIA

(75) Inventor: Shuji Ono, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 1049 days.

(21) Appl. No.: 12/129,321

(22) Filed: May 29, 2008

(65) Prior Publication Data

US 2008/0297643 A1 Dec. 4, 2008

(30) Foreign Application Priority Data

May 30, 2007 (JP) .................... 2007-144209
May 27, 2008 (JP) .................... 2008-138599

(51) Int. Cl.
*H04N 5/217* (2011.01)
*H04N 9/64* (2006.01)
*G06K 9/40* (2006.01)
*G02F 1/03* (2006.01)

(52) U.S. Cl. ........ 348/348; 348/241; 382/255; 382/275; 359/249

(58) Field of Classification Search .......... 348/241, 348/348; 382/255, 275, 282; 359/249
See application file for complete search history.

(56) References Cited

U.S. PATENT DOCUMENTS

| 5,748,371 A | 5/1998 | Cathey, Jr. et al. |
| 2002/0118457 A1 | 8/2002 | Dowski, Jr. |
| 2007/0285553 A1* | 12/2007 | Morita et al. ................. 348/335 |
| 2008/0174678 A1* | 7/2008 | Solomon ................. 348/231.99 |
| 2008/0192139 A1* | 8/2008 | Kanai et al. .................... 348/360 |

FOREIGN PATENT DOCUMENTS

JP 2006-094469 A 4/2006

OTHER PUBLICATIONS

Notice of Reasons for Refusal, dated Mar. 27, 2012, issued in corresponding JP Application No. 2008-138599, 4 pages in English and Japanese.

* cited by examiner

*Primary Examiner* — Justin P Misleh
*Assistant Examiner* — Dillon Durnford Geszvain
(74) *Attorney, Agent, or Firm* — Sughrue Mion, PLLC

(57) ABSTRACT

Provided is an image capturing apparatus, including: an optical system causing a light receiving section to receive, in substantially the same spread, light from positions within a predetermined range of positional relation, and has different optical transfer functions for light from different positions lying within the predetermined range; a storage storing each process parameter for correcting the effect of an optical transfer function on the captured image, in association with a condition regarding a positional relation between a subject and the optical system to be satisfied in performing correction using the process parameter; an obtaining section obtaining positional information indicating a positional relation between a subject and the optical system; and a selecting section selecting a process parameter stored in the process parameter storage in association with a condition that the positional relation indicated by the positional information obtained by the positional information obtaining section satisfies.

14 Claims, 16 Drawing Sheets

185

| | | FILTER A | FILTER B |
|---|---|---|---|
| OPERATIONAL MODE | CLOSE-RANGE MODE | O | |
| | LONG-RANGE MODE | | O |
| | MACRO MODE | O | |
| DISTANCE | <50cm | O | |
| | ≧50cm | | O |
| IMAGE CHARACTERISTIC QUANTITY | THE RATIO OF BLACK IS 35% TO 60% AND THE RATIO OF COLOR CREATED BY A COMBINATION OF TWO COLORS EXCEEDS 90% | O | |
| SPACE FREQUENCY CHARACTERISTIC | OTF ID#1 | O | |
| | OTF ID#2 | | O |

FIG. 8

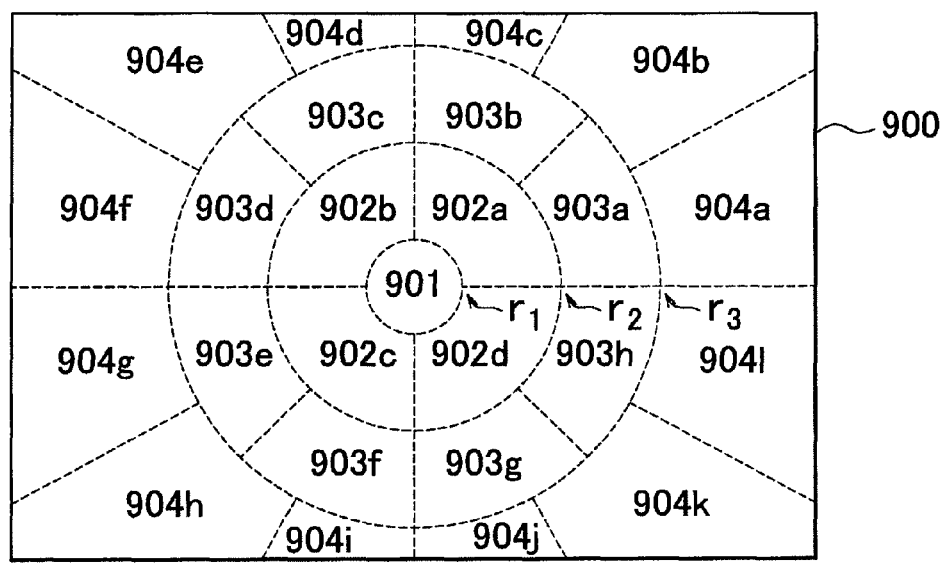
F I G . 9

165

| OTFID | FREQUENCY COMPONENT DATA | DISTANCE |
|---|---|---|
| #1 | OTF DATA (A) | 30cm |
| #2 | OTF DATA (B) | 3m |

FIG. 13

IMAGE CAPTURING APPARATUS, IMAGE CAPTURING METHOD, AND COMPUTER READABLE MEDIA

CROSS REFERENCE TO RELATED APPLICATION

The present application claims priority from a Japanese Patent Application No. 2007-144209 filed on May 30, 2007 and a Japanese Patent Application No. 2008-138599 filed on May 27, 2008, the contents of which are incorporated herein by reference.

BACKGROUND

1. Technical Field

The present invention relates to an image capturing apparatus, an image capturing method, and a program. In particular, the present invention relates to an image capturing apparatus, an image capturing method, and to a program for the image capturing apparatus.

2. Description of the Related Art

An optical mask for rendering the optical transfer function to be substantially constant within a certain range from a focus position is known, for example as disclosed in U.S. Pat. No. 5,748,371, and U.S. Patent Application Publication No. 2002/0118457.

By using the optical mask disclosed in U.S. Pat. No. 5,748,371, and U.S. Patent Application Publication No. 2002/0118457, the optical transfer function can be rendered to be substantially constant within a certain range from a focus position. However, even in that range, the optical transfer function will experience a subtle change as the distance changes. In addition, it is difficult to render a substantially constant optical transfer function for a nearby subject such as captured in a macro mode, or a distanced subject such as a background in image capturing of landscapes. If such a subject undergoes the same reproduction processing, adequate reproduction of the resulting subject image cannot be possible in many cases.

SUMMARY

According to a first aspect of the innovations herein, provided is an image capturing apparatus for capturing an image of a subject, including: an optical system that causes a light receiving section of the image capturing apparatus to receive, in substantially the same spread, light from respective positions lying within a predetermined range of positional relation with respect to the image capturing apparatus, and has different optical transfer functions for light from different positions lying within the predetermined range of positional relation with respect to the image capturing apparatus; a process parameter storage that stores each process parameter for correcting the effect of an optical transfer function exerted on a captured image, in association with a condition related to a positional relation between a subject and the optical system, where the condition is to be satisfied in performing correction using the process parameter; a positional information obtaining section that obtains positional information indicating a positional relation between a subject and the optical system; and a process parameter selecting section that selects a process parameter that is stored in the process parameter storage in association with a condition that the positional relation indicated by the positional information obtained by the positional information obtaining section satisfies.

It is possible to arrange so that the optical system causes the light receiving section to receive, in substantially the same spread, light from respective positions lying within a predetermined range of distance from the optical system, and has different optical transfer functions for light from different positions lying within the predetermined range of distance from the optical system, the process parameter storage stores each process parameter for correcting the effect of the optical transfer function exerted on the captured image, in association with a condition related to the distance from the optical system, where the condition is to be satisfied in performing correction using the process parameter, the positional information obtaining section obtains distance information indicating a distance between a subject and the optical system, and the process parameter selecting section selects a process parameter that is stored in the process parameter storage in association with a condition that the distance indicated by the distance information obtained by the positional information obtaining section satisfies.

The image capturing apparatus may further include an image processing section that corrects the effect of the optical transfer function exerted on the captured image, by using the process parameter selected by the process parameter selecting section. The optical system may cause the light receiving section to receive, in substantially the same spread, light from respective positions lying within a predetermined range of distance from the optical system, by means of transverse aberration.

It is also possible to arrange so that the positional information obtaining section obtains an operational mode for dealing with a captured image resulting from capturing an image of a subject in a close-range mode or an operational mode for dealing with a captured image resulting from capturing an image of a subject in a long-range mode, as the positional information, the process parameter storage stores each process parameter for correcting the effect of the optical transfer function exerted on the captured image, in association with a condition related to an operational mode of the image capturing apparatus in dealing with a captured image to be corrected using the process parameter, and the process parameter selecting section selects a process parameter stored in the process parameter storage in association with a condition that the operational mode obtained by the positional information obtaining section satisfies.

According to a second aspect of the innovations herein, provided is a method for capturing an image using an optical system that causes a light receiving section of an image capturing apparatus to receive, in substantially the same spread, light from respective positions lying within a predetermined range of positional relation with respect to the image capturing apparatus, and has different optical transfer functions for light from different positions lying within the predetermined range of positional relation with respect to the image capturing apparatus, the image capturing apparatus capturing an image of a subject, the image capturing method including: storing each process parameter for correcting the effect of an optical transfer function exerted on the captured image, in association with a condition related to a positional relation between a subject and the optical system, where the condition is to be satisfied in performing correction using the process parameter; obtaining positional information indicating a positional relation between a subject and the optical system; and selecting a process parameter that is stored in the process parameter storing in association with a condition that the positional relation indicated by the positional information obtained in the positional information obtaining satisfies.

According to a third aspect of the innovations herein, provided is a computer readable media including a program for an image capturing apparatus for capturing an image of a subject, the image capturing apparatus including an optical system that causes a light receiving section of the image capturing apparatus to receive, in substantially the same spread, light from respective positions lying within a predetermined range of positional relation with respect to the image capturing apparatus, and has different optical transfer functions for light from different positions lying within the predetermined range of positional relation with respect to the image capturing apparatus, the computer readable media causing, by means of execution of the program, a computer to function as: a process parameter storage that stores each process parameter for correcting the effect of an optical transfer function exerted on a captured image, in association with a condition related to a positional relation between a subject and the optical system, where the condition is to be satisfied in performing correction using the process parameter; a positional information obtaining section that obtains positional information indicating a positional relation between a subject and the optical system; and a process parameter selecting section that selects a process parameter that is stored in the process parameter storage in association with a condition that the positional relation indicated by the positional information obtained by the positional information obtaining section satisfies.

The summary of the invention does not necessarily describe all necessary features of the present invention. The present invention may also be a sub-combination of the features described above.

According to the innovations herein, adequately reproduction of a subject image becomes possible.

BRIEF DESCRIPTION OF THE DRAWINGS

FIG. 8 shows exemplary data stored in a process parameter storage 185.

FIG. 9 shows an example of a plurality of image regions in a captured image.

FIG. 13 shows exemplary data stored in an optical characteristic storage 165.

DESCRIPTION OF EXEMPLARY EMBODIMENTS

The invention will now be described based on the preferred embodiments, which do not intend to limit the scope of the present invention, but exemplify the invention. All of the features and the combinations thereof described in the embodiment are not necessarily essential to the invention.

Figure 1:
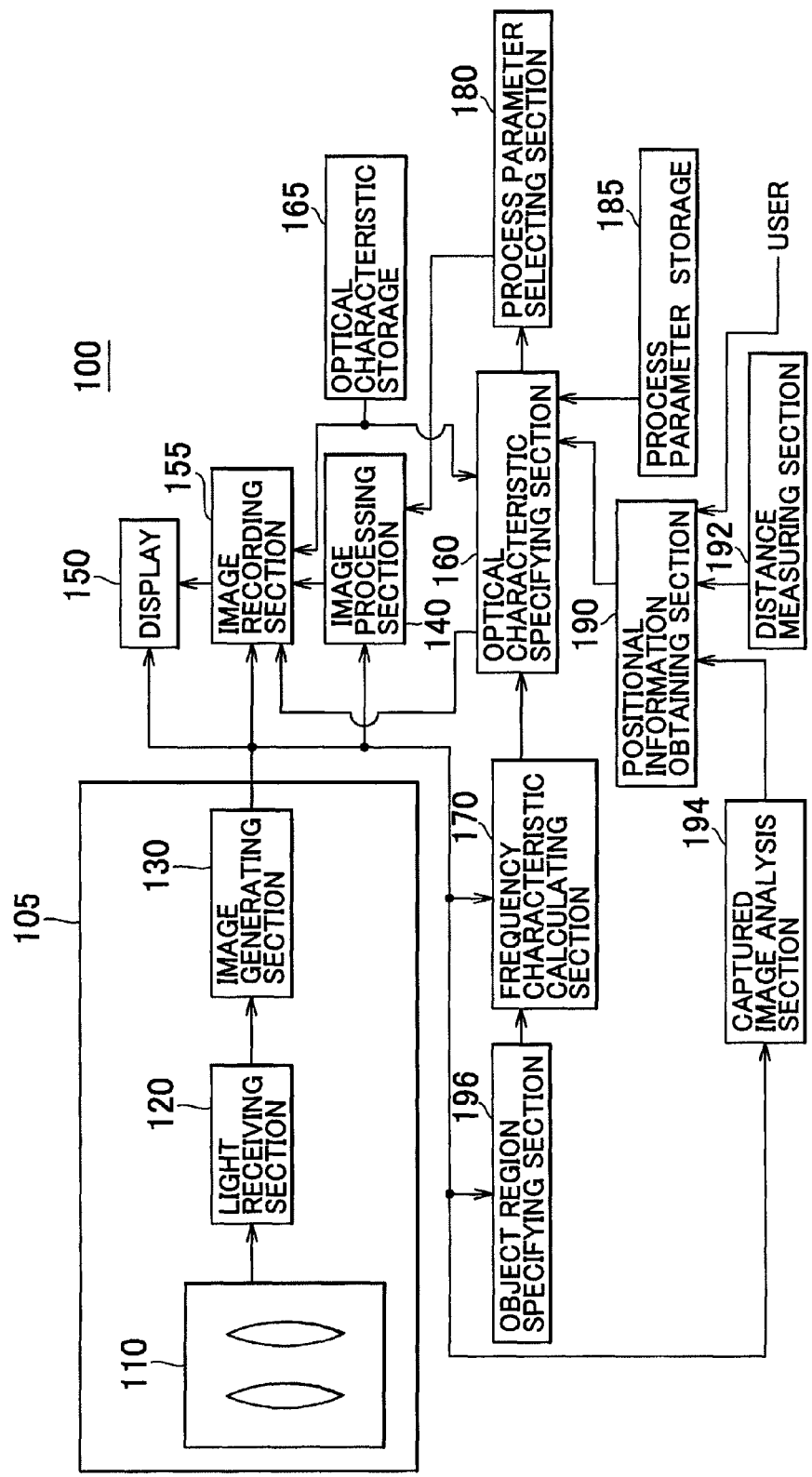
FIG. 1 shows an exemplary configuration of an image capturing apparatus 100.

FIG. 1 shows an exemplary configuration of an image capturing apparatus 100. The image capturing apparatus 100 includes an image capturing section 105, an image processing section 140, a display 150, an image recording section 155, an optical characteristic specifying section 160, an optical characteristic storage 165, a frequency characteristic calculating section 170, an optical characteristic storage 165, a process parameter selection section 180, a positional information obtaining section 190, a distance measuring section 192, a captured image analysis section 194, and a subject region specifying section 196.

The image capturing section 105 includes an optical system 110 for forming an image of light, a light receiving section 120 for receiving the light resulting from image forming of the optical system 110, and an image generating section 130 that generates a captured image based on the quantity of light from the optical system 110, which has been received by the light receiving section 120. The frequency characteristic calculating section 170 includes a frequency component difference calculating section 172, a sum calculating section 174, and an optical transfer function selecting section 176. The image capturing apparatus 100 captures an image of a subject, thereby generating a captured image.

The image capturing section 105 captures an image of a subject via the optical system 110. Specifically, the light receiving section 120 includes a plurality of light receiving elements arranged two-dimensionally. The image generating section 130 generates a captured image of a subject by A/D converting the quantities of light respectively received by the plurality of light receiving elements. The image processing section 140 corrects the captured image generated by the image generating section 130 based on the quantity of received light after A/D conversion, the position of each light receiving element, and the optical transfer function of the optical system 110, thereby generating a reproduced image. The display 150 displays either the captured image or the reproduced image generated by the image processing section 140. Note that the display 150 may be a display for showing an image to a user.

The optical system 110 has a different optical transfer function depending on the distance up to each subject. The optical characteristic of the optical system 110 is detailed later. Since the defocus hardly affects the optical transfer function of the optical system 110, the image processing section 140 employs, for reproduction processing of the captured image, the most suitable one of several representative optical transfer functions of the optical system 110 depending on the distance up to a particular subject.

The optical system 110 causes the light receiving section 120 of the image capturing apparatus 100 to receive, in substantially the same spread, light from respective positions lying within a predetermined range of positional relation with respect to the image capturing apparatus 100. The optical system 110 has different optical transfer functions for light from different positions within a predetermined range of positional relation with respect to the image capturing apparatus 100. The process parameter storage 185 stores each process parameter for correcting the effect of the optical transfer function exerted on the captured image, in association with a condition related to the positional relation between the subject and the optical system 110, where the condition is to be satisfied in performing correction using the process parameter. The positional information obtaining section 190 obtains positional information indicating a positional relation between the subject and the optical system 110. The process parameter selecting section 180 selects a process parameter that is stored in the process parameter storage 185 in association with a condition that the positional relation indicated by the positional information obtained by the positional information obtaining section 190 satisfies.

Note that the positional relation may be a distance between the optical system 110 and a subject. That is, the optical system 110 causes the light receiving section 120 to receive, in substantially the same spread, light from respective positions lying within a predetermined range of distance from the optical system 110. The optical system 110 has different optical transfer functions for light from different positions within a predetermined range of distance from the optical system 110. The process parameter storage 185 stores each process parameter for correcting the effect of the optical transfer function exerted on the captured image, in association with a condition related to the distance from the optical system 110, where the condition is to be satisfied in performing correction using the process parameter. The positional information obtaining section 190 obtains distance information indicating a distance between the subject and the optical system 110. The process parameter selecting section 180 selects a process parameter that is stored in the process parameter storage 185 in association with a condition that the distance indicated by the distance information obtained by the positional information obtaining section 190 satisfies.

Besides the distance between the optical system 110 and the subject, the positional relation may further include a distance between the optical axis and the subject in a plane vertical to the optical axis. That is, the optical system 110 has different optical transfer functions for light from positions lying within a predetermined range of distance from the optical system 110 and having different distances from the optical system 110 in the optical axis direction and different distances from the optical axis. Note that the distance from the optical axis may mean a length of a vertical line drawn from the position of the subject towards the extension of the optical axis. The process parameter storage 185 stores each process parameter for correcting the effect of the optical transfer function exerted on each of image regions within a captured image, in association with a condition related to the distance of the subject captured in the image region in the optical axis direction, and with a condition related to the distance of the image region from an optical axis point that is a point of the captured image belonging to the optical axis, where the distance of the image region from the optical axis point corresponds to the distance of the subject captured in the image region from the optical axis and the conditions are to be satisfied in performing correction using the process parameter. The positional information obtaining section 190 obtains, for each image region, a distance between a captured subject and the optical system 110 as well as a distance from the optical axis point, as positional information. The process parameter selecting section 180, for each image region, selects a process parameter that is stored in the process parameter storage 185 in association with conditions that the distance from the optical system 110 and the distance from the optical axis point obtained by the positional information obtaining section 190 satisfy.

Besides the distance between the optical system 110 and the subject, or the distance between the optical axis and the subject in a plane vertical to the optical axis, the positional relation may still further include an angle around an intersection between the vertical plane and the optical axis. That is, the optical system 110 has different optical transfer functions for light from different positions lying within a predetermined range of distance from the optical system 110 and having different distances from the optical system 110 in the optical axis direction, different distances from the optical axis, and different angles around the intersection between the optical axis and the subject plane. The process parameter storage 185 stores each process parameter for correcting the effect of the optical transfer function exerted on each of image regions within a captured image, in association with a condition related to the distance of the subject captured in the image region in the optical axis direction, with a condition related to the distance of the image region from the optical axis point, and with a condition related to an angle indicating a position of the image region around the optical axis point, where the angle represents an angle indicating the subject captured in the image region around the intersection and the conditions are to be satisfied in performing correction using the process parameter. The positional information obtaining section 190 obtains, for each image region, a distance between a captured subject and the optical system 110, a distance from the optical axis point, and the angle around the optical axis point, as positional information. The process parameter selecting section 180, for each image region, selects a process parameter that is stored in the process parameter storage 185 in association with conditions that the distance from the optical system 110, the distance from the optical axis point, and the angle around the optical axis point obtained by the positional information obtaining section 190 satisfy.

In this way, the optical system 110 has different optical transfer functions for light from different positions lying within a predetermined range of distance from the optical system 110 and having different distances from the optical system 110 in the optical axis direction of the optical system 110 and different positional relations in relation to the optical axis of the optical system 110. The process parameter storage 185 stores each process parameter for correcting the effect of the optical transfer function exerted on each of the image regions within a captured image, in association with a condition related to the distance of the subject captured in the image region in the optical axis direction and with a condition related to the position of the image region in the captured image that indicates the positional relation in relation to the optical axis of the optical system 110, where the conditions are to be satisfied in performing correction using the process parameter. The positional information obtaining section 190 obtains, for each image region, a distance between a captured subject and the optical system 110 and a position of the image region in the captured image, as positional information. The process parameter selecting section 180, for each image region, selects a process parameter that is stored in the process parameter storage 185 in association with conditions that the distance from the optical system 110 and the position of the image region obtained by the positional information obtaining section 190 satisfy. Then the image processing section 140, for each of the mage regions, corrects the effect of the optical transfer function exerted on the image region, by using the process parameter selected by the process parameter selecting section 180.

Note that the optical system 110 may cause the light receiving section 120 to receive, in substantially the same spread, light from respective positions lying within a predetermined range of distance from the optical system 110, by means of transverse aberration. The image processing section 140 corrects the effect of the optical transfer function exerted on the captured image, by using the process parameter selected by the process parameter selecting section 180.

The positional information obtaining section 190 obtains a distance up to a subject, which has been measured by the distance measuring section 192. The distance measuring section 192 may be a laser distance-measuring sensor that obtains a distance up to a subject by means of a laser. The process parameter storage 185 stores each process parameter for correcting the effect of the optical transfer function exerted on the captured image, in association with a condition related to a distance up to a subject, where the condition is to be satisfied in performing correction using the process parameter. The process parameter selecting section 180 selects a process parameter that is stored in the process parameter storage 185 in association with a condition that the distance measured by the distance measuring section 192 satisfies.

The distance measuring section 192 may measure distances of subjects captured respectively in a plurality of image regions. The positional information obtaining section 190, for each of the image regions, may obtain the distance measured by the distance measuring section 192 as well as the position of the image region in the captured image, as positional information. The process parameter selecting section 180, for each image region, may select a process parameter that is stored in the process parameter storage 185 in association with conditions that the distance up to the optical system 110 as well as the distance up to the position of the image region from the optical axis point obtained by the position information obtaining section 190 satisfy.

The captured image analysis section 194 analyzes the image contents of a captured image. The positional information obtaining section 190 obtains the analysis result of the captured image analysis section 194. The process parameter storage 185 stores each process parameter for correcting the effect of an optical transfer function exerted on a captured image, in association with a condition related to the image contents of a captured image to be satisfied in performing correction using the process parameter. The process parameter selecting section 180 selects a process parameter that is stored in the process parameter storage 185 in association with a condition that the analysis result obtained by the positional information obtaining section 190 satisfies.

In the above manner, the image capturing apparatus 100 has been described based on the image contents. Please note that the optical transfer function can be directly specified based on the image contents of the captured image. Specifically, the optical characteristic storage 165 stores the space frequency characteristic of each of a plurality of optical transfer functions of the optical system 110. The frequency characteristic calculating section 170 calculates the space frequency characteristic of the captured image. As the optical transfer function of the optical system 110, the optical characteristic specifying section 160 specifies, from among the plurality of optical transfer functions, an optical transfer function, the space frequency characteristic of which matches the space frequency characteristic calculated by the frequency characteristic calculating section 170.

The frequency characteristic calculating section 170 calculates the space frequency characteristic for each partial region of a captured image. For each of these partial regions, the optical characteristic specifying section 160 specifies an optical transfer function, the space frequency characteristic of which matches the space frequency characteristic calculated by the frequency characteristic calculating section 170 for each partial region. The image processing section 140 provides image processing for correcting the optical transfer function specified for each partial region by the optical characteristic specifying section 160, for each partial region of the captured image.

More specifically, the subject region specifying section 196 specifies a plurality of subject regions in a captured image. The frequency characteristic calculating section 170 calculates the space frequency characteristic for each subject region. For each of these subject regions, the optical characteristic specifying section 160 specifies an optical transfer function, the space frequency characteristic of which matches the space frequency characteristic calculated by the frequency characteristic calculating section 170 for each subject region. The image processing section 140 provides image processing for correcting the optical transfer function specified for each subject region by the optical characteristic specifying section 160, for each subject region of the captured image.

In association with the distance from the optical system 110 and subjects, the optical characteristic storage 165 stores a plurality of optical transfer functions of the subjects located within the distance. The image recording section 155 may record the captured image added with distance information that indicates a distance stored in the optical characteristic storage 165 in association with the optical transfer function specified by the optical characteristic specifying section 160.

Figure 2:
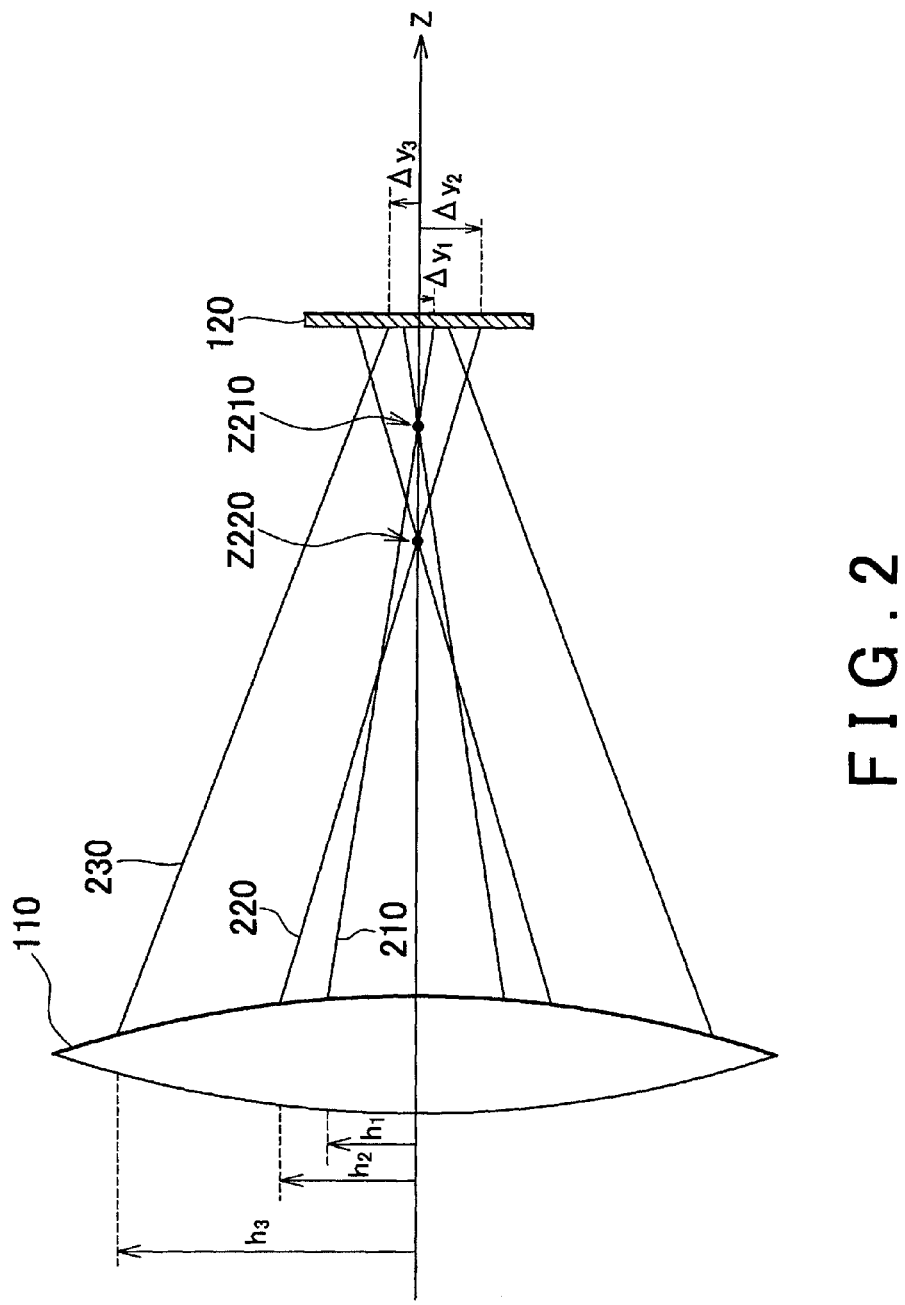
FIG. 2 schematically shows an exemplary optical characteristic of an optical system 110.

FIG. 2 schematically shows an exemplary optical characteristic of an optical system 110. The optical system 110 forms an image of the light 210 incident from the height h1, at the position Z2 that is nearer to the optical system 110 than the light receiving section 120 is in the optical axis direction, the light 210 is received at the position lower by $\Delta y1$ from the optical axis in the light receiving section 120. In this way, the transverse aberration of the light 210 in the optical system 110 will be a negative value. The optical system 110 forms an image of the light incident from the height h2 that is higher than h1, at the position Z220 that is further nearer to the optical system 110 than the position Z210 is in the optical axis direction, and the light receiving section 120 receives the light 220 at the position lower by $\Delta y2$ from the optical axis, where $\Delta y2$ is greater than $\Delta y1$.

The optical system 110 receives light incident from the height h3 that is further higher than h2, at the position higher by $\Delta y3$ from the light axis in the light receiving section 120. In other words, by using the optical system 110, as the incident height from the optical axis gets larger, the transverse aberration gets smaller, and at certain height the transverse aberration reaches a maximum value. After the incident height exceeds the maximum value, the transverse aberration increases, and at a certain height the transverse aberration becomes 0. As the incident height gets further larger, the transverse aberration exceeds 0.

Note that the light receiving surface of the light receiving section 120 is substantially planar and is composed of a plurality of light receiving elements. The light receiving surface of the light receiving section 120 is provided substantially vertical to the optical axis of the optical system 110. Note that the light receiving element may be a CCD image capturing device, or a MOS image capturing device.

As described, the optical characteristic of the optical system 110 has been qualitatively described with reference to FIG. 2. Note that the schematic diagram of the optical system 110 as well as the light receiving section 120 of FIG. 2 is drafted for the purpose of facilitating understanding of the optical characteristic of the optical system 110, and so is not in full scale.

Figure 3:
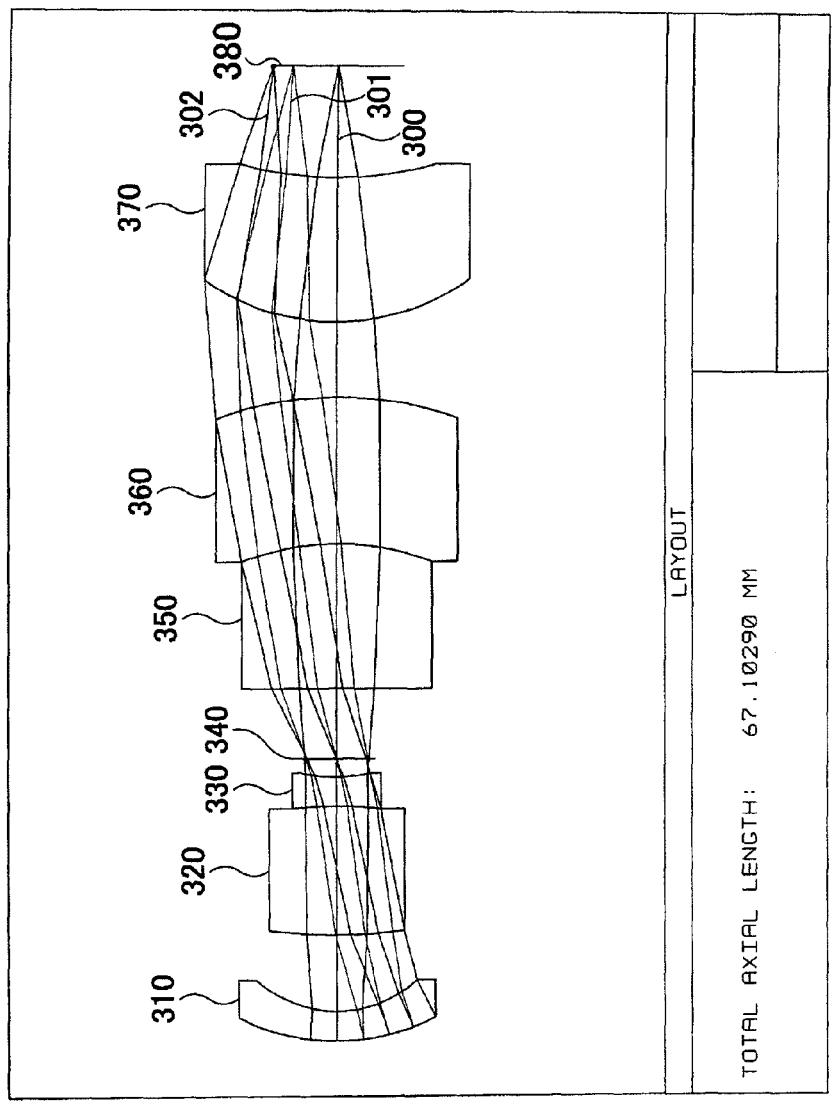
FIG. 3 shows an exemplary configuration of the optical system 110.
Figure 4:
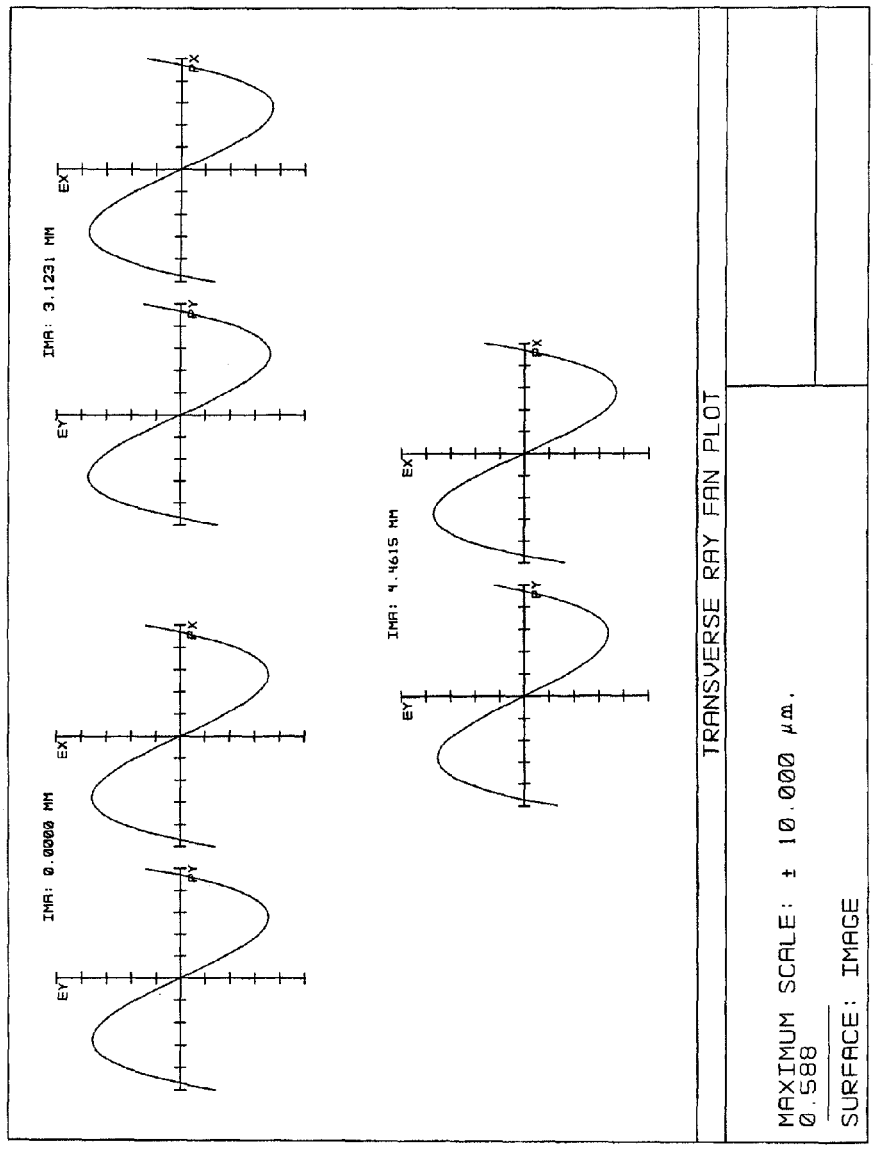
FIG. 4 shows a transverse aberration characteristic of the optical system 110.
Figure 5:
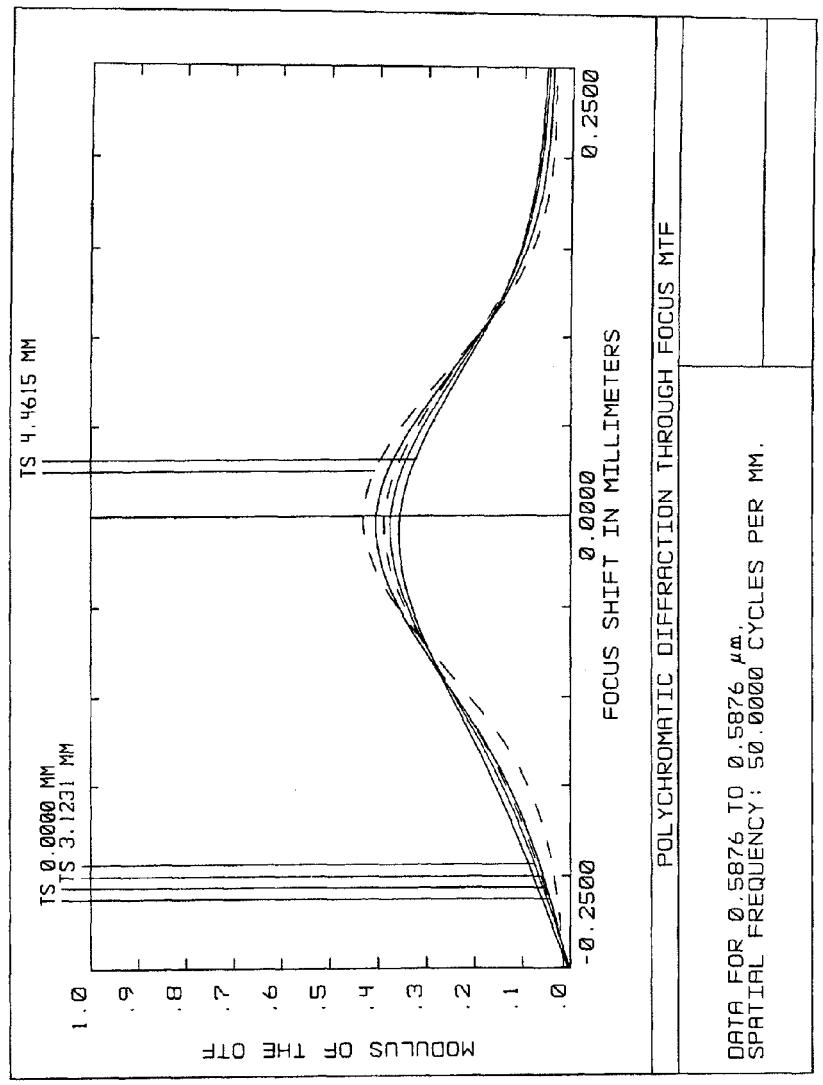
FIG. 5 shows an MTF characteristic of the optical system 110.
Figure 6:
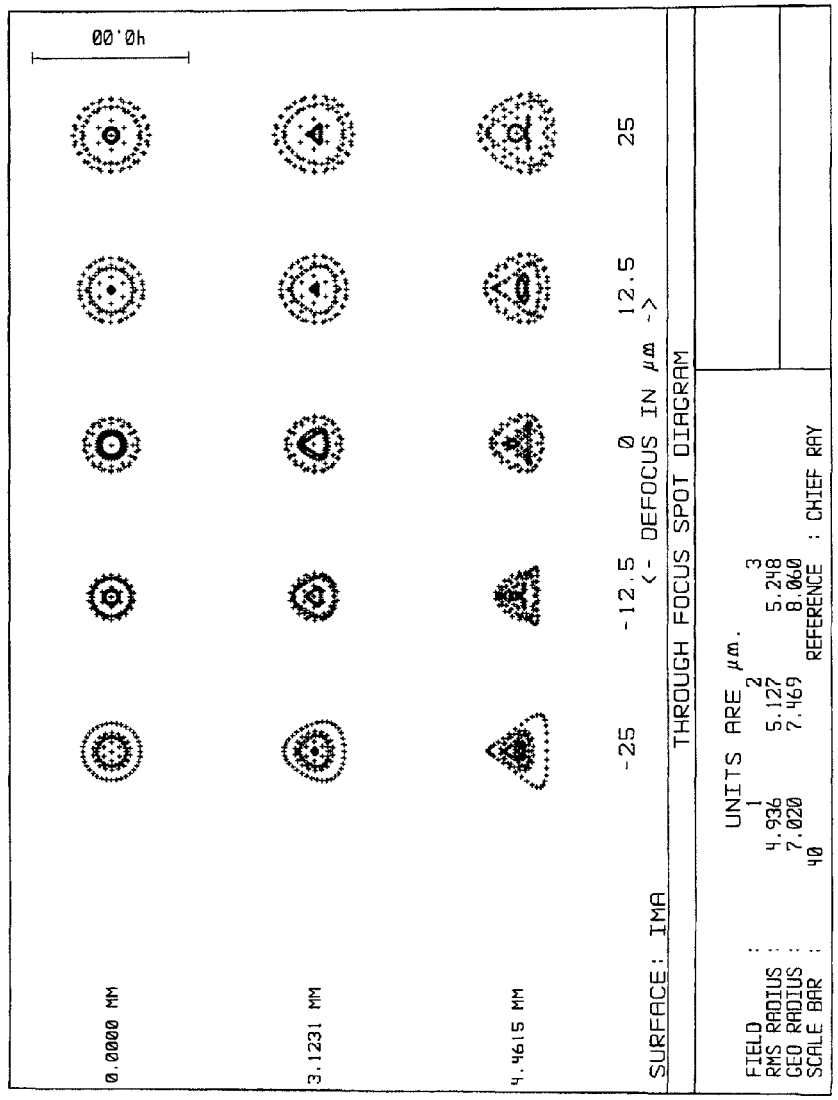
FIG. 6 shows an exemplary spot diagram according to the optical system 110.

FIG. 3 shows an exemplary configuration of the optical system 110. The optical system 110 includes a plurality of optical elements 310, 320, 330, 350, 360, and 370, and a diaphragm 340. The light receiving surface of the light receiving section 120 is represented by the image surface 380 in the present drawing. Note that three rays of principle light 300, 301, and 302 are drawn to overlap the optical system 110 in the present drawing. FIGS. 4, 5, and 6 show the optical characteristic of the optical system 110 with respect to the light of the wavelength of 0.5876 nm represented by the rays of principle light 300, 301, and 302. The following describes the optical data of the optical elements 310, 320, 330, 350, 360, and 370.

The optical element 310 has a refractive index of 1.66445663 and a thickness of 1.997163 mm. The curvature and the diameter of the optical element 310 at the side of the subject are respectively 15.20834 mm and 13.47915 mm. The curvature and the diameter of the optical element 310 at the side of the image surface 380 are respectively 8.153898 mm and 10.99605 mm. Note that the thickness in the description of the present drawing indicates the length of the optical element in the optical axis direction.

The optical element 320 is distant from the optical element 310 by 5.193977 mm towards the image surface 380 in the optical axis direction. Here, the distance is between the surface of the optical element 310 facing the image surface 380 and the surface of the optical element 320 facing the subject, which applies to any corresponding distance in the following description. The optical element 320 has a refractive index of 1.92285059 and a thickness of 8.880505 mm. The curvature and the diameter of the optical element 320 at the side of the subject are respectively 38.38834 mm and 9.300722 mm. The curvature and the diameter of the optical element 320 at the side of the image surface 380 are respectively −28.17275 mm and 6.105449 mm.

The optical element 330 is in contact with the optical element 320. The optical element 330 has a refractive index of 1.46449858 and a thickness of 1.99997 mm. The curvature and the diameter of the optical element 330 at the side of the image surface 380 are respectively 10.8814 mm and 4.69059 mm. The diaphragm 340 is distant from the optical element 330 by the distance of 1.245339 mm towards the image surface 380 in the optical axis direction, and the diameter of the diaphragm 340 is 4.432406 mm.

The optical element 350 is distant from the diaphragm 340 by the distance of 4.864987 mm towards the image surface 380 in the optical axis direction. The optical element 350 has a refractive index of 2.02203350 and a thickness of 10.00014 mm. The curvature and the diameter of the optical element 350 at the side of the subject are respectively −443.0356 mm and 8.913335 mm. The curvature and the diameter of the optical element 350 at the side of the image surface 380 are respectively −17.46664 mm and 13.00595 mm.

The optical element 360 is in contact with the optical element 350. The optical element 360 has a refractive index of 1.50012841 and a thickness of 10.13764 mm. The curvature and the diameter of the optical element 360 at the side of the image surface 380 are respectively −23.90391 mm and 16.52799 mm.

The optical element 370 is distant from the optical element 360 by 5.136917 mm towards the image surface 380 in the optical axis direction. The optical element 370 has a refractive index of 2.02203350 and a thickness of 9.916248 mm. The curvature and the diameter of the optical element 370 at the side of the subject are respectively 15.68482 mm and 18.15194 mm. The curvature and the diameter of the optical element 370 at the side of the image surface 380 are respectively 25.22519 mm and 13.3875 mm. The image surface 380 is distant from the optical element 370 by the distance of 7.73001 mm.

FIG. 4 shows a transverse aberration characteristic of the optical system 110. As shown in FIG. 4, the optical system 110 has substantially the same transverse aberration characteristic in the X direction and the Y direction throughout a plurality of image heights. Such a transverse aberration characteristic is obtained by a design for rendering substantially the same transverse aberration characteristic. In this design a transverse aberration characteristic is given by a cubic function. Specifically, a function for representing a transverse aberration characteristic is $\Delta y = ax^3 - ab^2 x$ where each of the coefficients "a" and "b" is a constant, and the target values of the coefficients "a" and "b" for achieving convergence are respectively set as $5 \times 10^{-4}$ and 10.

In this design, as described later, the target value of the x coordinate yielding an extreme value of the transverse aberration is determined by the coefficient "b", and the target value of the extreme value is determined by the coefficient "a". Note that the size of the extreme value may be designated by the coefficient b, according to the intervals between the light receiving elements of the light receiving section 120 so as to yield a size of transverse aberration in the image surface 380 at least larger than the intervals between the light receiving elements of the light receiving section 120. The transverse aberration characteristic with respect to the light of each image height is calculated by changing the parameter of each optical element of the optical system 110. The parameter of each optical element is changed up to when the error between the calculated transverse aberration characteristic and the predetermined transverse aberration characteristic becomes smaller than the predetermined value. Note that the function for representing the transverse aberration characteristic is not limited to the cubic function, as long as it is symmetrical with respect to an origin and has an extreme value, e.g. sine function.

As shown in FIG. 2, the transverse aberration for the optical system 110 is 0 when x=0. Looking at the change in transverse aberration when the x coordinate is changed towards the positive direction, the transverse aberration increases until reaching an extreme value. The transverse aberration curve is substantially symmetrical with respect to the origin. In this way, the relation between the incident position and the transverse aberration with respect to the light incident to the incident position is such that the transverse aberration gets larger as the distance from the optical axis to the incident position gets longer within the range between the first incident position distanced from the optical axis by the first distance and the optical axis, and that the relation is substantially symmetrical with respect to the optical axis, where the incident position indicates a position of the optical system 110 on the incident pupil. In addition, the relation between the incident position and the transverse aberration is continuous in relation to the distance from the optical axis to the incident position.

Further as shown in FIG. 2, when the x coordinate becomes larger than the value yielding the extreme transverse aberration, the transverse aberration starts to decrease. As the x coordinate gets further larger, the transverse aberration will reach 0 and thereafter starts to increase. In this way, the derivative value of the transverse aberration in relation to the incident position at the first incident position from the optical axis is smaller than the derivative value of the transverse aberration in relation to the incident position in the vicinity of the optical axis. To be more specific, the derivative value of the transverse aberration in relation to the incident position at the first incident position is 0. Moreover, the transverse aberration gets smaller as the distance from the optical axis to the incident position gets longer within the range between the first incident position and the second incident position that is distant from the optical axis by the second distance that is longer than the first distance.

The transverse aberration for the light incident to the second incident position is 0. Further, the transverse aberration gets larger as the distance from the optical axis to the incident position gets longer within the range between the second incident position and the third incident position that is distant from the optical axis by the third distance that is longer than the second distance. As explained in the above design, the transverse aberration of the optical system 110 is represented by a cubic function of a distance from the optical axis to the incident position. The transverse aberration of the optical system 110 may also be represented by a sine function of a distance from the optical axis to the incident position.

FIG. 5 shows an MTF characteristic of the optical system 110. The present MTF diagram has a horizontal axis that represents a defocus quantity from the image surface 380 towards the optical axis direction, and a vertical axis that represents an MTF value. FIG. 6 shows an exemplary spot diagram according to the optical system 110.

Referring to FIG. 5, the optical system 110 has substantially the same distribution of MTF value for a plurality of image heights, a sagittal ray, and a meridional ray. It is also understood that the optical system 110 has the MTF value of equal to or above a predetermined value, e.g. 0.2, within a wide range of defocus quantity. FIG. 6 shows spot diagrams of the optical system 110 where the horizontal direction represents the defocus quantity and the vertical direction represents the image height. It is understood also from FIG. 6 that the spot diagram has substantially the same spread within the predetermined range of defocus quantity and image height. In this way, the optical system 110 causes the light receiving section 120 to receive light from the subject positioned within the predetermined range of distance from the optical system 110, at substantially the same spread due to the transverse aberration. As described above since the spread of light of the optical system 110 is substantially the same throughout the predetermined range of defocus quantity and image height, the image processing section 140 is able to perform reproduction processing to the image obtained from the light received by the light receiving section 120 through the optical system 110, by using substantially the same inverse filter.

Although the spread of light of the optical system 110 is substantially the same as mentioned above, the spot diagrams in FIG. 6 are slightly different from each other depending on the defocus. Specifically, the spot diagram has a core therein for a positive defocus, whereas has an annular form or a ring-like form for a negative defocus. Although the spot diagrams in FIG. 6 are obtained at several defocus locations, the change in spot diagram depending on the distance up to the subject has the similar tendency. For example, for light from a subject in the vicinity of the optical system 110, the light bundle will widen out due to the effect of the transverse aberration for the light passing through the periphery of the optical system 110 and the result of the subject positioned in the vicinity of the optical system 110, and so the spot diagram will have an annular form. On the other hand, since the optical system 110 has a small transverse aberration at the center, the optical system 110 will focus narrow the light close to the paraxial light from a distanced subject, and so the resulting spot diagram will have a core therein.

Figure 7:
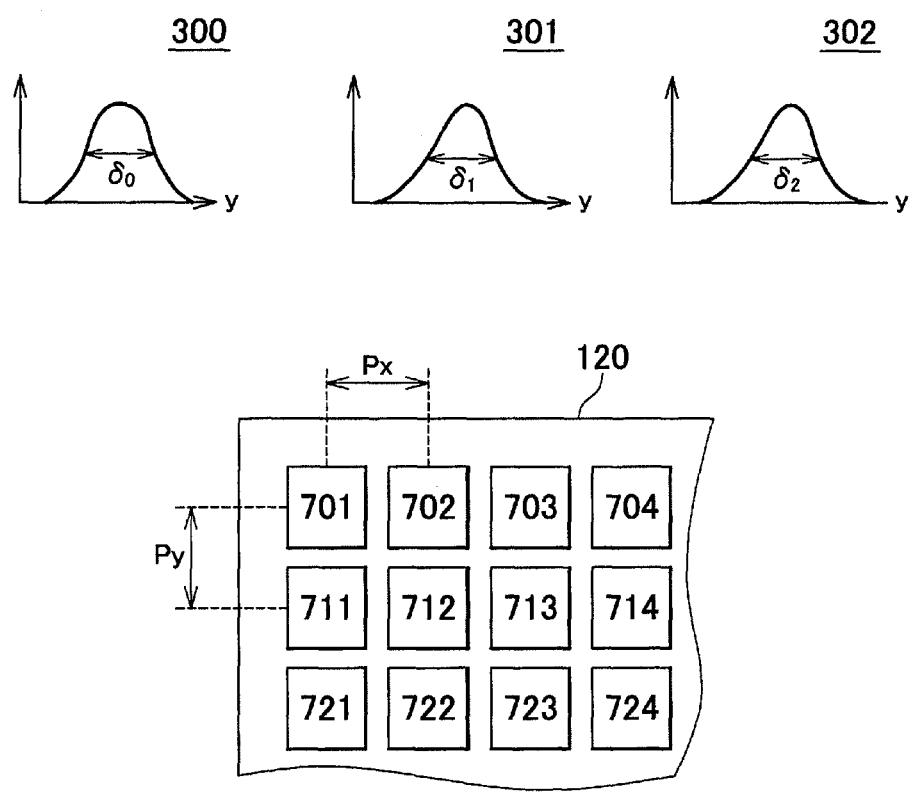
FIG. 7 shows an example of a response of the optical system and of an array of light receiving elements.

FIG. 7 shows an example of a response of the optical system 110 responding to a point light source, and an array of light receiving elements included in the light receiving section 120. As described above, the optical system 110 has substantially the same spread with respect to a plurality of image heights. Accordingly, if the light receiving section 120 positions within a predetermined range of defocus quantity, the half bandwidths $\delta 0$, $\delta 1$, and $\delta 2$ of the response of the optical system 110 responding to the point light source can be made substantially the same as described. Note that the width of defocus quantity yielding substantially the same half bandwidths $\delta 0$, $\delta 1$, and $\delta 2$ is controllable by defining a target value of the x coordinate that yields an extreme value of transverse aberration. For example, the above-mentioned width of defocus quantity is controllable by determining the value of the coefficient "b" in the transverse aberration characteristic $\Delta y = ax^3 - ab^2 x$.

The light receiving section 120 has a plurality of light receiving elements 701-704, 711-714, 721-724, . . . . The light receiving elements in the light receiving section 120 are arranged in a constant interval therebetween, as well as at a pitch Px in the x direction and a pitch Py in the y direction. In this case, the optical system 110 may be designed by designating the transverse aberration characteristic of the optical system 110 so that the half bandwidths $\delta 0$, $\delta 1$, and $\delta 2$ of the response become larger than the pixel pitches Px and Py. Specifically, when the transverse aberration characteristic $\Delta y = ax^3 - ab^2 x$ is given by the above-described design, the target value of the coefficient "a" is determined so that the half bandwidths $\delta 0$, $\delta 1$, and $\delta 2$ of the response become larger than any of the pixel pitches Px and Py. In this way, in designing the optical system 110, the target value of the coefficient "b" is determined in accordance with the allowable width of the defocus quantity, and the target value of the coefficient "a" is determined in accordance with the pixel pitch of the light receiving elements of the light receiving section 120.

When the image capturing apparatus 100 captures a color image, a light receiving element occasionally receives light of a wavelength corresponding to a different color. In such a case, the pixel pitch may be a distance between the light receiving elements receiving light of a wavelength corresponding to the same color. For example, suppose a case where the light receiving elements 701, 703, 712, 714, 721, and 723 receive light of a wavelength corresponding to green, the light receiving elements 702, 704, 722, and 724 receive light of a wavelength corresponding to blue, and the light receiving elements 711 and 713 receive light of a wavelength corresponding to red. In this case, the pixel pitch may be a distance between the center of the light receiving element 701 and the center of the light receiving element 721 in the y direction, and a distance between the center of the light receiving element 701 and the center of the light receiving element 703 in the x direction.

The light receiving section 120 may be provided between an intersection between the optical axis and the light incident parallel to the optical axis from the first incident position and the paraxial image point of the optical system 110. Specifically, the light receiving section 120 may be provided near the midpoint between the intersection and the paraxial image point of the optical system 110.

The display 150 may display an image obtained according to the quantity of light received by the light receiving section 120. Specifically, the display 150 displays an image generated by the image generating section 130. When the number of pixels of the display 150 is smaller than the number of light receiving elements of the optical system 110, the display 150 may display the image by thinning the pixels, without spatially averaging the image generated by the image generating section 130. The image capturing apparatus 100 may not include a focus control apparatus for changing the focal length of the optical system 110 so that the focal length of the optical system 110 is a fixed value. The image capturing apparatus 100 may also not include an optical low pass filter for spatially scattering the light from a subject.

FIG. 8 shows exemplary data stored in the process parameter storage 185 in a table format. The process parameter storage 185 stores information regarding a frequency filter, e.g. filters A and B, used for reproduction processing, in association with a condition regarding the operational mode, the distance, the image characteristic quantity, and the space frequency characteristic. Specifically, the operational mode may indicate whether the image capturing apparatus 100 should perform close-range image capturing. For example, the positional information obtaining section 190 obtains the close-range mode as positional information when an instruction for activating the barcode reader software is received from a user, where the barcode reader software is for analyzing the barcode and the close-range mode is an operational mode for performing close-range image capturing. On the other hand when an instruction for capturing an image of a landscape is received from a user, the positional information obtaining section 190 obtains a long-range mode as positional information, where the long-range mode is an operational mode for performing long-range image capturing.

Note that the operational mode is operated by the image capturing apparatus 100 in dealing with a captured image. For example, the operational mode may be operated by the image capturing apparatus 100 in processing, displaying, storing a captured image, or outputting a captured image to outside. In other words, the operational mode may indicate a software operation of the image capturing apparatus 100. For example, when an operational mode is set, the image capturing apparatus 100 does not have to adjust the optical characteristic of the optical system 110 such as a focal length in accordance with the operational mode. For example, when an instruction for activating the barcode reader software is received from a user, the image capturing apparatus 100 processes a captured image according to an instruction of a program included in the barcode reader software.

When a user has instructed to capture an image of a landscape via the image capturing menu or the like, the positional information obtaining section 190 may obtain a long-range mode as positional information, according to the instruction. Furthermore, the positional information obtaining section 190 may obtain a long-range mode as positional information, based on the positional information corresponding to the image capturing apparatus 100. For example, the image capturing apparatus 100 obtains information about the latitude and the longitude of the position in which the image capturing apparatus 100 positions, from the GPS information. Then the positional information obtaining section 190 may obtain a long-range mode as positional information, if the position indicated by the information about the latitude and the longitude corresponds to a predetermined region in which the landscape such as a mountain or the sea is characteristic.

Note that the operational mode includes an image capturing mode automatically selected by a user, e.g. macro mode. When it is determined that the image capturing apparatus 100 should perform flash image capturing, the positional information obtaining section 190 may obtain an image capturing mode other than the close-range mode as positional information. In this way, the positional information obtaining section 190 obtains the operational mode of the image capturing apparatus 100 such as the close-range mode, the long-range mode, a normal image capturing mode, a macro mode, as positional information. Then the process parameter selecting section 180 selects the filter A or the filter B stored in the process parameter storage 185 in association with these operational modes. For example, when the operational mode is a close-range mode, the process parameter selecting section 180 selects the filter A.

The distance stored in the process parameter storage 185 may include a range of distance up to a subject. In this case, the positional information obtaining section 190 obtains the distance up to the subject from the distance measuring section 192. The process parameter selecting section 180 selects a filter stored in the process parameter storage 185 in association with a range including the distance obtained by the positional information obtaining section 190. For example, when the distance up to the subject is 20 cm, the process parameter selecting section 180 selects the filter A.

The image characteristic quantity stored in the process parameter storage 185 may include the characteristic quantity of a color. The color characteristic quantity stored in the process parameter storage 185 may be information regarding a ratio of black and white. For example, the process parameter storage 185 may store a condition regarding the image characteristic quantity such that "the ratio of black is 35% to 60%." The image characteristic quantity may also be the number of color components. For example, the process parameter storage 185 may further store a condition regarding the image characteristic quantity such that "the ratio of color created by a combination of two colors including black exceeds 90%".

For example, the barcode may often be printed in black on the background in a solid color. The ratio of black is expected to be about 50% on average. Also in the barcode region, the total area of the two colors of black and white is expected to occupy nearly 100% of the entire region. However, the barcode image in the captured image is expected to be blurred due to the optical characteristic of the optical system 110. For this reason, the barcode image in the captured image is expected to include a color created by a combination of the intensity of the two colors. Therefore, 90% or more of the area of the barcode image is expected to be the color created by the combination of black and white.

Therefore, the captured image analysis section 194 calculates the ratio occupied by black and the ratio occupied by the color created by the combination of the two colors in the captured image. Then the positional information obtaining section 190 obtains the calculation result of the captured image analysis section 194 as positional information. The process parameter selecting section 180 selects a filter stored in the process parameter storage 185 in association with the conditions that the ratio occupied by black and the ratio occupied by the color created by the combination of the two colors satisfy.

In this way, the process parameter storage 185 stores each process parameter for correcting the effect of the optical transfer function exerted on the captured image, in association with an operational mode of the image capturing apparatus 100 in dealing with a captured image to be corrected using the process parameter. The positional information obtaining section 190 obtains either the operational mode for dealing with a subject image captured in a close-range mode or the operational mode for dealing with a subject image captured in a long-range mode, as positional information. The process parameter selecting section 180 selects a process parameter stored in the process parameter storage 185 in association with the operational mode obtained by the positional information obtaining section 190.

The process parameter storage 185 stores each process parameter for correcting the effect of the optical transfer function exerted on the captured image, in association with an image capturing mode of the image capturing section 100 in capturing a captured image to be corrected using the process parameter. The positional information obtaining section 190 obtains an image capturing mode for capturing a close range subject, as positional information. The process parameter selecting section 180 selects a process parameter stored in the process parameter storage 185 in association with the image capturing mode obtained by the positional information obtaining section 190.

As described above, the positional information obtaining section 190 obtains an instruction about a positional relation between a subject and the optical system 110, such as an instruction about an operational mode or an instruction about an image capturing mode, as positional information. Note that an example of the instruction may cause the image capturing apparatus 100 to perform a software operation, such as an instruction for activating the barcode reader software as described above. In addition, the process parameter storage 185 stores each process parameter for correcting the effect of the optical transfer function exerted on the captured image, in association with the condition related to an instruction obtained in capturing an image, where the condition is to be satisfied in performing correction using the process parameter. Examples of the instruction are the operational mode or the image capturing mode described above. The process parameter selecting section 180 may select a process parameter that is stored in the process parameter storage 185 in association with a condition that the instruction obtained by the positional information obtaining section 190 satisfies.

The space frequency characteristic stored in the process parameter storage 185 may include a space frequency characteristic of a captured image. For example, as a condition related to a space frequency characteristic, the optical characteristic storage 165 may store information (OTFID) identifying an optical transfer function that matches, to the greatest extent, the space frequency characteristic of the captured image. Note that the operation of the process parameter selecting section 180 in selecting a filter based on a space frequency characteristic is described with reference to FIG. 10 and the subsequent drawings.

FIG. 9 shows an example of a plurality of image regions in a captured image. The captured image includes a first image region 901 that contains an optical axis point being a point corresponding to the optical axis in the captured image, a plurality of second image regions 902a-d, a plurality of third image regions 903a-h, and a plurality of fourth image regions 904a-l. Note that in the following description, the second image regions 902a-d, the third image regions 903a-h, and the fourth image regions 904a-h may respectively collectively be referred to as a second image region 902, a third image region 903, and a fourth image region 904.

The second image region 902 is located around the first image region 901. The third image region 903 is located around the second image region 902, and the fourth image region 904 is located around the third image region 903. The second image region 902 is adjacent to the first image region 901 and to the third image region 903. The third image region 903 is adjacent to the second image region 902 and to the fourth image region 904. Specifically, the first image region 901 has a center at the optical axis point and a radius of r1. The second image region 902 corresponds to a region having a center at the optical axis point and a radius of r2 from which the first image region 901 is subtracted. The third image region 903 corresponds to a region having a center at the optical axis point and a radius of r3 from which the first image region 901 and the second image region 902 are subtracted. The fourth image region 904 corresponds to the entire captured image from which the first image region 901, the second image region 902, and the third image region 903 are subtracted.

The process parameter storage 185 stores the filters explained with reference to FIG. 8, in association with information respectively identifying the first image region 901, the plurality of second image regions 902, the plurality of third image regions 903, and the plurality of fourth image regions 904. In this way, the process parameter storage 185 stores the filters for correcting the images in the respective image regions, in association with the information respectively identifying the plurality of image regions divided as circles having a center at the optical axis point, as well as divided in a radial direction with the optical axis point as the origin.

As shown in the present drawing, the number of image regions in the captured image increases as the distance from the optical axis point gets longer. For example, the number of divided image regions increases along the distance, e.g. represented by r1, r2, and r3, from the optical axis point, in such a manner that there are four second image regions 902, eight third image regions 903, and twelve fourth image regions 904. The process parameter storage 185 may accordingly store filters for correcting the images of the image regions, in association with information respectively specifying the image regions explained above in great detail.

The process parameter storage section 180 stores the filters in association with the information respectively identifying each of the first image region 901, the plurality of second image regions 902, the plurality of third image regions 903, and the plurality of fourth image regions 904. For each of the image regions 901, 902, 903, and 904, the process parameter selecting section 180 selects a filter corresponding to the distance up to the subject indicated by the positional information obtained by the positional information obtaining section 190, from among the filters stored in the process parameter storage section 185. For example, the distance measuring section 192 may measure the distance up to a subject captured in each of the image regions 901, 902, 903, and 904. The process parameter selecting section 180 may select, from among the filters stored in the process parameter storage section 185, a filter corresponding to the distance measured by the distance measuring section 192 for each of the image regions 901, 902, 903, and 904. The image processing section 140 corrects the image by using the filter selected by the process parameter selecting section 180, for each of the image regions 901, 902, 903, and 904.

The process parameter storage 185 stores a filter such as an inverse filter for an optical transfer function of the optical system 110 for light from the position of each of the plurality of image regions, in association with a condition related to the three dimensional positional relation between the optical system 110 and a subject captured in each of the plurality of image regions. The positional information obtaining section 190 obtains positional information indicating the three dimensional positional relation between the captured subject and the optical system 110, for each of the plurality of image regions. The process parameter selecting section 180 selects, for each of the plurality of image regions, a process parameter stored in the process parameter storage 185 in association with a condition that the three dimensional positional relation indicated by the positional information obtained by the positional information obtaining section 190 satisfies.

As described above, according to the image capturing apparatus 100, each image in each of the plurality of image regions is corrected, by for example using an inverse filter corresponding to the optical transfer function for the light from the position of the subject captured in each of the image regions. Therefore the image of the subject captured in each image region can be adequately reproduced.

Figure 10:
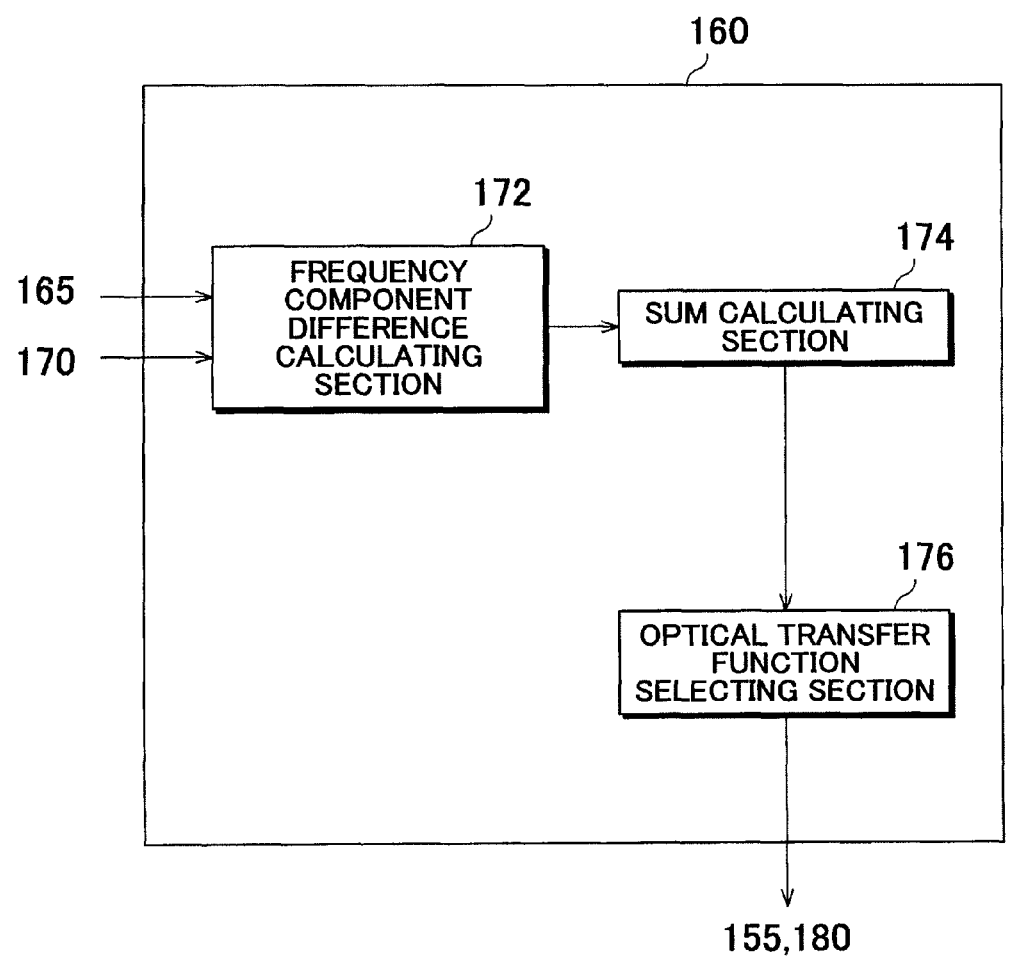
FIG. 10 shows an exemplary block configuration of an optical characteristic specifying section 160.
Figure 11:
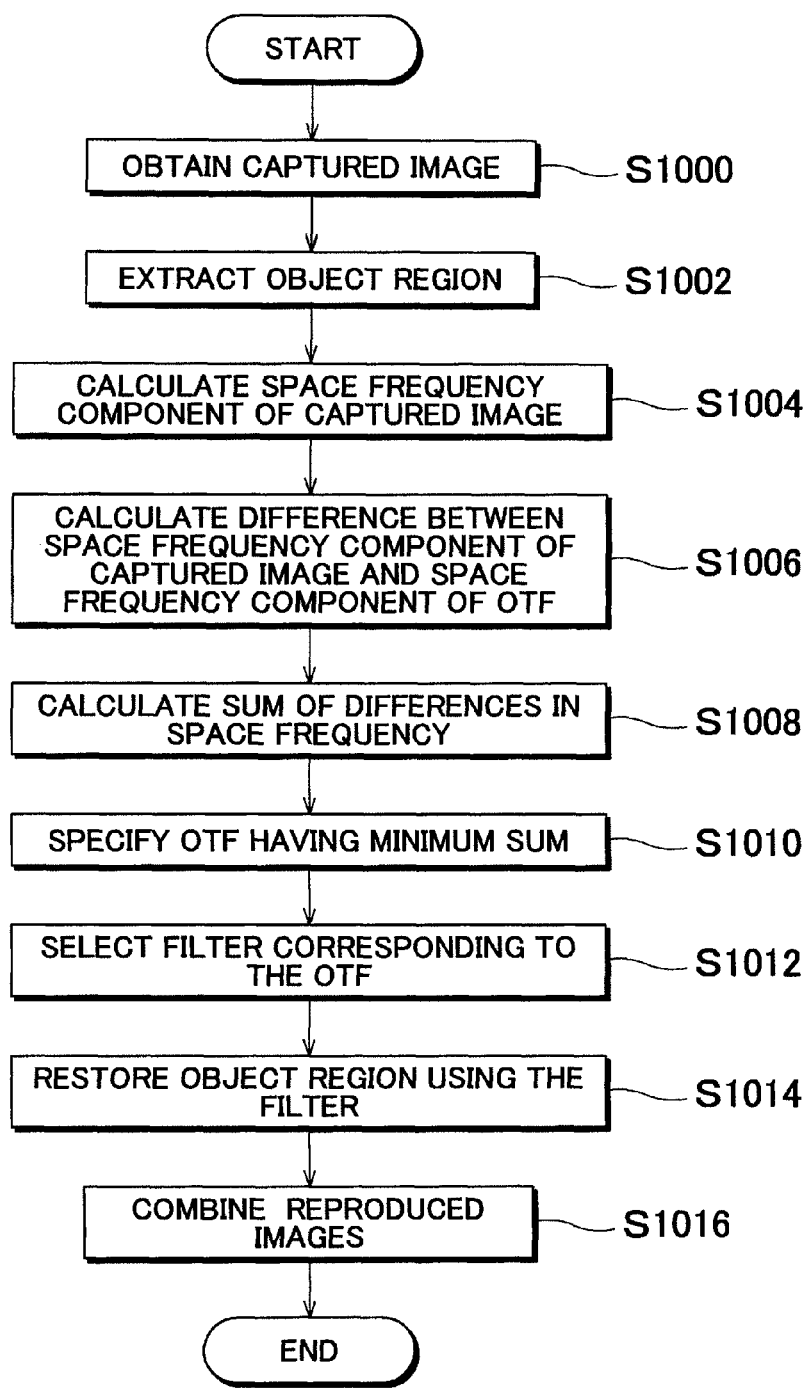
FIG. 11 shows an exemplary reproduction processing flow performed by the image capturing apparatus 100.

FIG. 10 shows an exemplary block configuration of an optical characteristic specifying section 160. The optical characteristic specifying section 160 includes a frequency component difference calculating section 172, a sum calculating section 174, and an optical transfer function selecting section 176. FIG. 11 shows an exemplary reproduction processing flow for reproducing the captured image performed by the image capturing apparatus 100. The present reproduction processing flow shows an exemplary processing flow for performing reproduction processing to the captured image, by estimating the optical transfer function of the optical system 110 from the image contents of the captured image. The operation of each constituting element of the optical characteristic specifying section 160 is described in the order of the reproduction processing flow of the present drawing.

The frequency component difference calculating section 172 obtains a captured image generated by the image generating section 130 (S1000). The object region specifying section 196 extracts a plurality of regions (hereinafter referred to as "a plurality of object regions") in which an object exists, from the captured image by means of edge extraction for example (S1002). Note that it is occasionally difficult to extract the edges from the captured image due to the blurring of the subject image by the optical system 100. In such a case, the object region specifying section 196 may provisionally perform reproduction processing to the captured image using a representative filter and extract the edges from the resulting reproduced image to specify the object regions.

Next, a reproduced image is generated for each object region by performing processing from S1004 to S1014 to each object region specified by the object region specifying section 196. The frequency characteristic calculating section 170 calculates the value of a space frequency component for each object region of the captured image (S1004). Specifically, the frequency characteristic calculating section 170 calculates the value of the space frequency component for each object region by performing Fourier transformation on each object region in the captured image.

The frequency component difference calculating section 172 calculates the difference between the value of the space frequency component calculated by the frequency characteristic calculating section 170 and the value of the space frequency component indicated by the optical transfer function, for each frequency (S1006). Then for each optical transfer function, the sum calculating section 174 calculates the sum of differences calculated by the frequency component difference calculating section 172 throughout the frequencies (S1008). The optical transfer function selecting section 176 selects an optical transfer function, the sum of which calculated by the sum calculating section 174 is smaller, as the optical transfer function of the optical system 110 (S1010). Specifically, the optical transfer function selecting section 176 selects the OTFID being identification information identifying the optical transfer function, the sum of which calculated by the sum calculating section 174 is smaller.

The process parameter selecting section 180 selects, for each object region, a filter, i.e. either the filter A or the filter B, which is stored in the process parameter storage 185 in association with the OTFID (S1012). The image processing section 140 obtains the reproduced image of each object region by filtering the space frequency region in each object region using the selected filter and performing inverse Fourier transform (S1014). The image processing section 140 combines thus reproduced images of the object regions, thereby generating a single reproduced image.

Note that in S1012 and S1014, the reproduction processing is performed using a filter of a frequency region. However in S1012 and S1014, it is also possible to perform reproduction processing by convolution that is substantially equivalent to the described filtering processing on the frequency region, to obtain a reproduced image. Specifically, the process parameter storage 185 stores a convolution filter in association with the OTFID identifying a plurality of optical transfer functions. The process parameter selecting section 180 selects a convolution filter stored in the process parameter storage 185 in association with the OTFID selected by the process parameter selecting section 180 in S1010. The image processing section 140 generates an image reproduced from the captured image by the convolution processing using the convolution filter selected by the process parameter selecting section 180.

In the above-described example, the optical transfer function of the optical system 110 is specified for each object region specified by the object region specifying section 196, then the image processing section 140 generates a reproduced image for each object region according to thus specified optical transfer function. However, the optical characteristic specifying section 160 may specify the optical transfer function for each predetermined region. The image processing section 140 may perform reproduction processing on each predetermined region according to the specified optical transfer function. The optical characteristic specifying section 160 may also specify the optical transfer function for each predetermined region for the image region in which the object region specifying section 196 was unable to specify the object region, for the image processing section 140 to perform reproduction processing.

As described above, the frequency characteristic calculating section 170 calculates the frequency distribution of the space frequency component of the captured image. The optical characteristic specifying section 160 specifies, from among the plurality of optical transfer functions, the optical transfer function having the frequency distribution of the space frequency component that matches, to a greater extent, the frequency distribution of the space frequency component calculated by the frequency characteristic calculating section 170, as the optical transfer function of the optical system 110.

Figure 12:
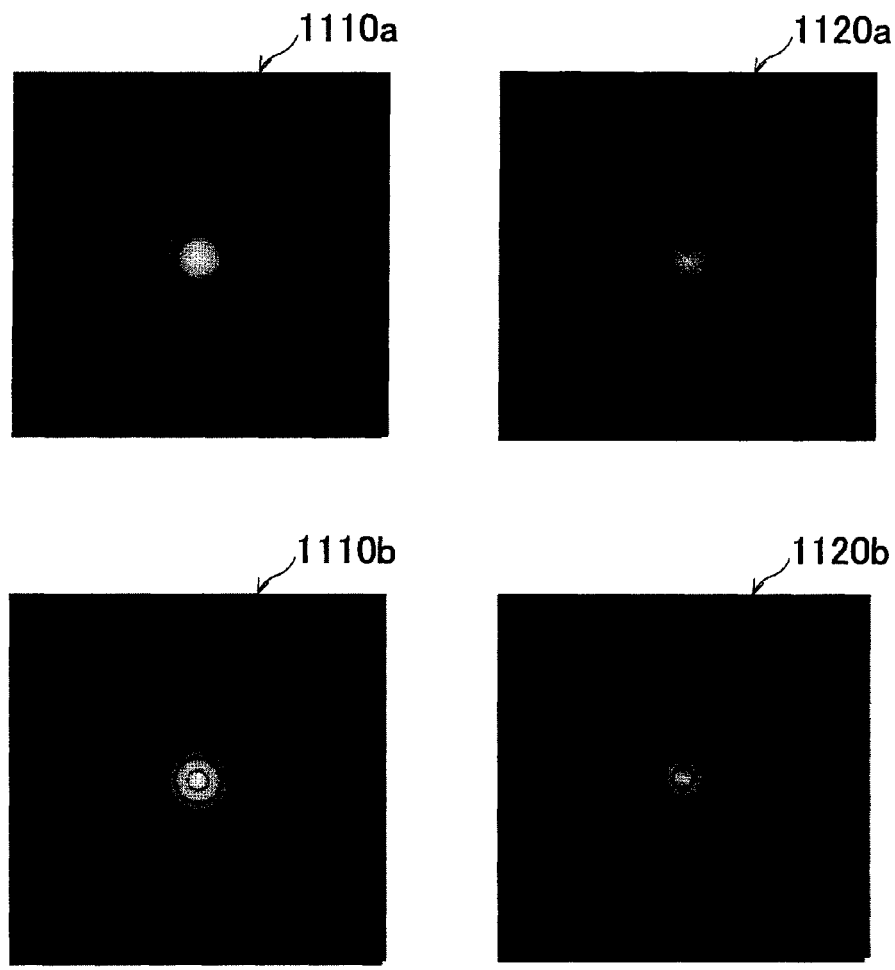
FIG. 12 shows an example of an optical transfer function and a space frequency characteristic of an image.

FIG. 12 shows one example of the frequency characteristic of the optical transfer function and the space frequency characteristic of the image. The frequency component distributions 1110a and 1110b show the frequency characteristics of two kinds of optical transfer functions by the grayscale information. The frequency component distributions 1120a and 1120b show, by grayscale information, the images resulting from performing Fourier transform to the image transferred according to the optical transfer function of the frequency characteristic indicated by the frequency component distribution 1110a and 1110b. Although containing the frequency component attributable to the image signal and the frequency component attributable to the edge of the image, the frequency component distribution 1120a and 1120b shows the difference attributable to the difference in optical transfer function. The optical characteristic specifying section 160 is able to easily specify the optical transfer function of the optical system 110 by extracting, from the frequency region, the difference caused on the captured image by different optical transfer functions.

FIG. 13 shows exemplary data stored in an optical characteristic storage 165 in a table format. The optical characteristic storage 165 stores the distance, the OTFID, and the frequency component data respectively showing the value of the space frequency component indicated by each of the plurality of optical transfer functions. The filter A corresponds to an inverse filter of the OTF data (A), and the filter B corresponds to an inverse filter of the OTF data (B). The optical characteristic storage 165 stores a representative distance up to a subject, which corresponds to the optical transfer function indicated by the OTF data. The image recording section 155 reads a distance stored in the optical characteristic storage 165 in association with the OTFID specified by the optical characteristic specifying section 160. The image recording section 155 outputs, to outside, the captured image or the reproduced image by assigning the distance to it.

As described so far, the optical characteristic storage 165 stores a plurality of optical transfer functions for respective positional relations between the optical system 110 and the subject. Specifically, the optical characteristic storage 165 stores a plurality of optical transfer functions for respective distances from the optical system 110 to the subject. More Specifically, the optical characteristic storage 165 stores respective space frequency characteristics, such as frequency distribution of the space frequency component, of the plurality of a plurality of optical transfer functions of the subjects, the distances of which from the optical system 110 lie within a predetermined distance range.

Figure 14:
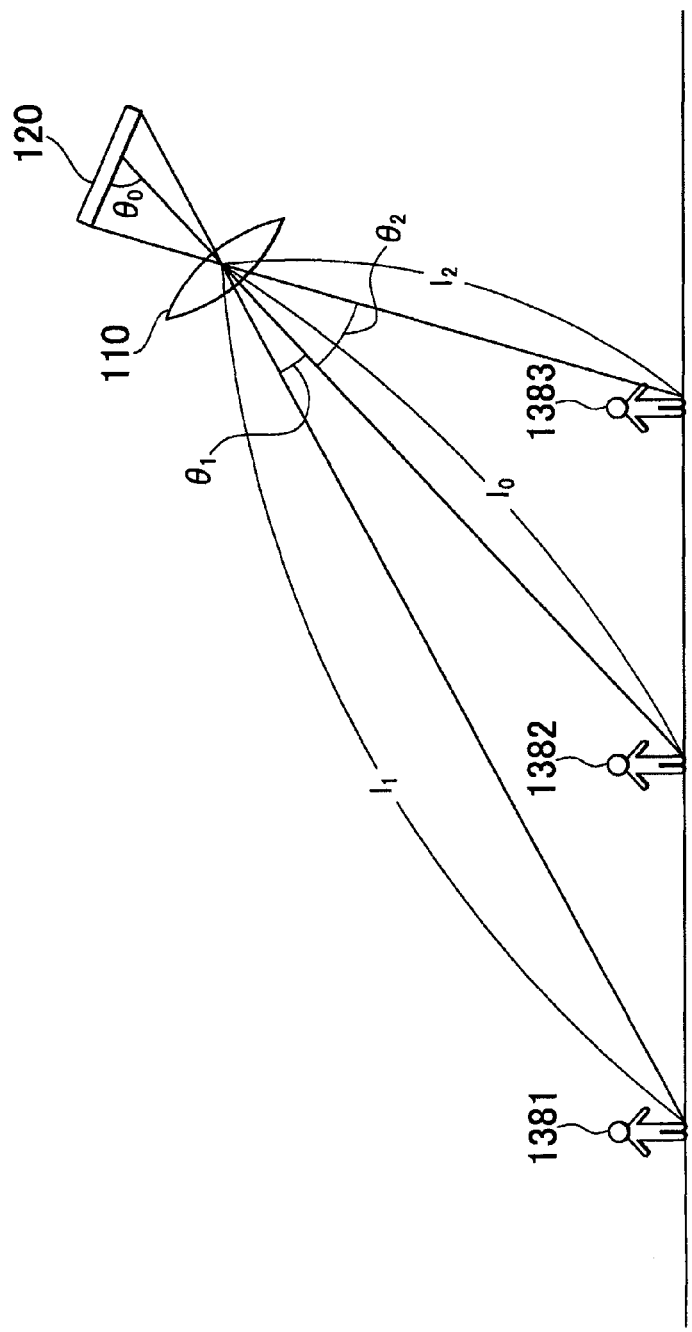
FIG. 14 shows an exemplary positional relation among the optical system 110, a light receiving section 120, and a subject in tilt-shift photography.

FIG. 14 schematically shows an exemplary positional relation among the optical system 110, a light receiving section 120, and a subject, which is caused when the image capturing section 105 conducts tilt-shift photography. As shown in FIG. 14, the optical axis of the optical system 110 intersects with the light receiving surface of the light receiving section 120 at an angle smaller than the right angle. By causing the light receiving surface of the light receiving section 120 and the optical axis to intersect with each other in a tilted manner, without orthogonalizing them, the enlargement factor for the subject 1381 positioned farther from the optical system 110 will be larger than the enlargement factor for the subject 1383 nearer to the optical system 110, which will reduce the possibility of causing the image of a far subject to be too small.

In performing tilt-shift photography, the image capturing section 105 can widen the distance range in which the image capturing section 105 can perform image capturing, and so there is a possibility that the optical transfer function of the optical system 110 cannot be regarded as substantially the same throughout its distance range. Therefore, in one embodiment, the process parameter storage 185 assigns different filters respectively for different image regions.

In general, the distance up to the subject, e.g. 11, 10, and 12, changes for each image capturing direction of the image capturing section 105. The distance up to the subject differs for each space configuration of the image-capturing target space. Therefore the process parameter storage 185 may desirably store a process parameter for correcting the effect of the optical transfer function to each of the plurality of image regions in a captured image, in association with the conditions related to the direction of the optical axis of the optical system 110 and the position of each of the plurality of image regions in the captured image. The positional information obtaining section 190 obtains the direction of the optical axis of the optical system 110 and the position of each of the plurality of image regions in the captured image, as positional information. The process parameter selecting section 180 may select a process parameter stored in the process parameter storage 185 in association with the condition that the direction of the optical axis and the position of each of the plurality of image regions obtained by the positional information obtaining section 190 satisfy.

The distance up to the subject, e.g. 11 and 12, also changes according to the angle θ0 formed between the optical axis of the optical system 110 and the light receiving surface of the light receiving section 120. The process parameter storage 185 stores each process parameter for correcting the effect of the optical transfer function exerted on each of the image regions in the captured image, in association with the conditions that the angle formed between the optical axis of the optical system 110 and the light receiving surface of the light receiving section 120 and the position of each of the plurality of image regions in the captured image satisfy. The positional information obtaining section 190 obtains the angle formed between the optical axis of the optical system 110 and the light receiving surface of the light receiving section 120 and the position of each of the plurality of image regions in the captured image, as positional information. The process parameter selecting section 180 may select a process parameter that is stored in the process parameter storage 185 in association with conditions that the angle and the position of each of the plurality of image regions obtained by the positional information obtaining section 190 satisfy.

More generally, the distance up to the subject changes, according to the three dimensional positional relation between the optical system 110 and the light receiving section 120. Therefore the process parameter storage 185 may store a process parameter for correcting the effect of the optical transfer function on each of the image regions in the captured image, in association with the conditions that the three dimensional positional relation between the optical system 110 and the light receiving section 120 and the position of each of the plurality of image regions in the captured image satisfy. Note that the positional relation may include the angles θ1 and θ2 formed between the lines linking the diagonal points on the rectangular light receiving surface of the light receiving section 120 and the principle point and the optical axis, besides θ0 described above. The process parameter storage 185 stores each process parameter for correcting the effect of the optical transfer function exerted on each of image regions in a captured image, in association with a positional relation between the optical system 110 and the light receiving section 120. The positional information obtaining section 190 obtains the positional relation between the optical system 110 and the light receiving section 120 as well as the position of each of the image regions in the captured image, as positional information. The process parameter selecting section 180 selects a process parameter stored in the process parameter storage 185 in association with conditions that the positional relation and the position of each of the image regions obtained by the positional information obtaining section 190 satisfy.

Figure 15:
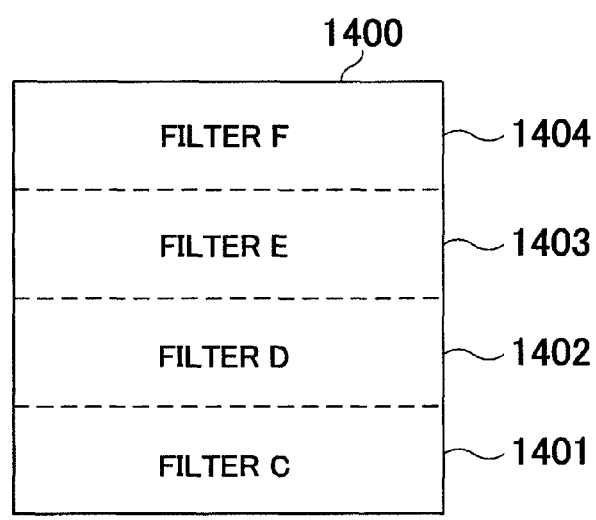
FIG. 15 shows filters assigned to a plurality of image regions in a captured image 1400.

FIG. 15 shows filters assigned to a plurality of image regions in a captured image 1400. As shown in FIG. 15, a filter C, a filter D, a filter E, and a filter F are assigned to the image regions 1401, 1402, 1403, and 1404 respectively. Note that the filter C, the filter D, the filter E, and the filter F may respectively be an inverse filter of the optical transfer function for the subject positioned even further.

As described above, the process parameter storage 185 stores each process parameter for correcting the effect of the optical transfer function exerted on each of the image regions in the captured image, in association with the condition that the position of each of the image regions in the captured image satisfies. The positional information obtaining section 190 obtains the position of each of the image regions in the captured image, as positional information. The process parameter selecting section 180 selects a process parameter stored in the process parameter storage 185 in association with the condition that the position of each of the image regions obtained by the positional information obtaining section 190 satisfies.

Figure 16:
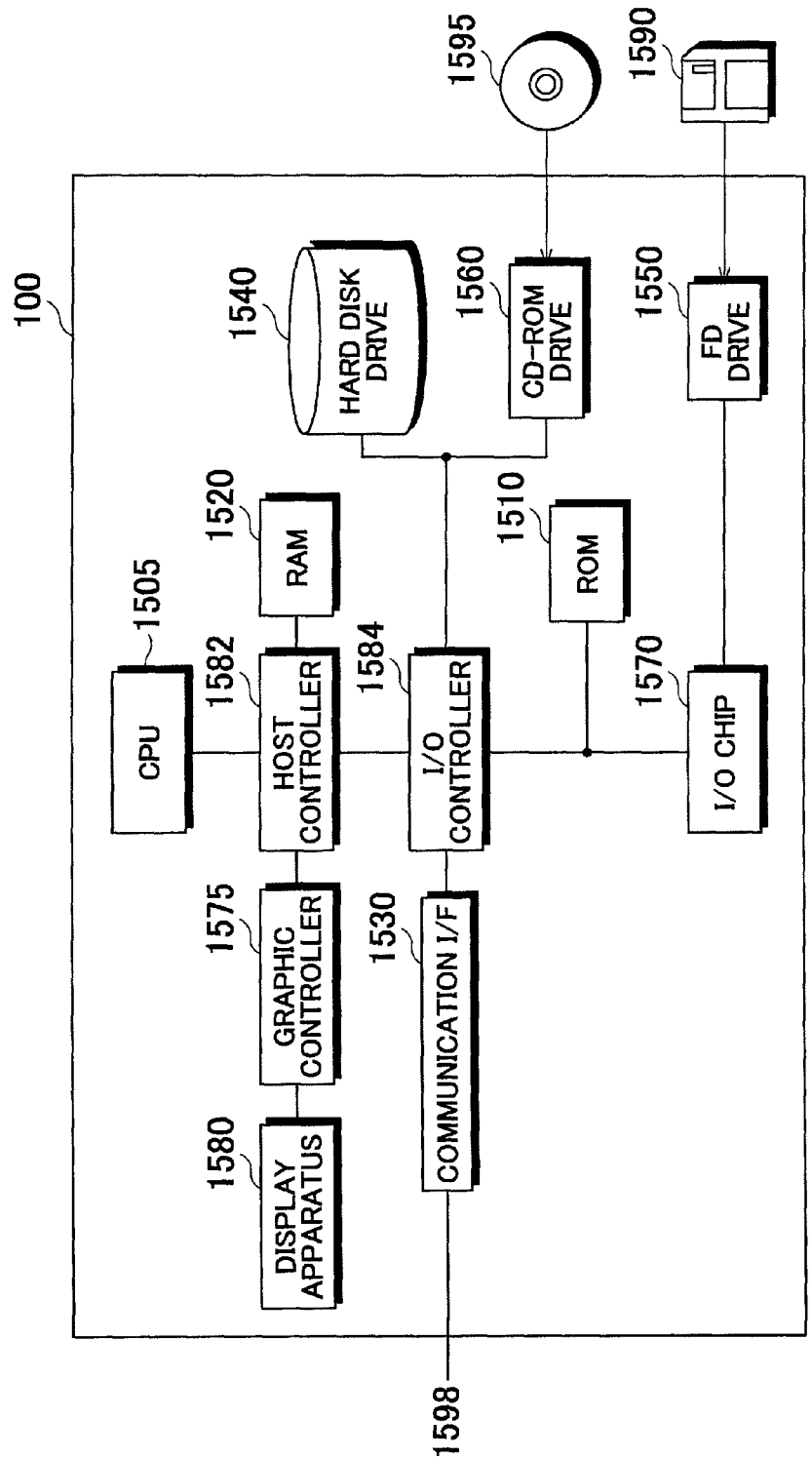
FIG. 16 shows an exemplary hardware configuration of the image capturing apparatus 100.

FIG. 16 shows one example of a hardware configuration of an image capturing apparatus 100 configured by an electronic information processing apparatus such as a personal computer. The image capturing apparatus 100 is provided with a CPU peripheral section, an input/output section, and a legacy input/output section. The CPU peripheral section includes a CPU 1505, a RAM 1520, a graphic controller 1575, and a display apparatus 1580 connected to each other by a host controller 1582. The input/output section includes a communication interface 1530, a hard disk drive 1540, and a CD-ROM drive 1560, all of which are connected to the host controller 1582 by an input/output controller 1584. The legacy input/output section includes a ROM 1510, a flexible disk drive 1550, and a input/output chip 1570, all of which are connected to the input/output controller 1584.

The host controller 1582 is connected to the RAM 1520 and is also connected to the CPU 1505 and the graphic controller 1575 accessing the RAM 1520 at a high transfer rate. The CPU 1505 operates to control each section based on programs stored in the ROM 1510 and the RAM 1520. The graphic controller 1575 obtains image data generated by the CPU 1505 or the like on a frame buffer provided inside the RAM 1520 and displays the image data in the display apparatus 1580. Alternatively, the graphic controller 1575 may internally include the frame buffer storing the image data generated by the CPU 1505 or the like.

The input/output controller 1584 connects the hard disk drive 1540 serving as a relatively high speed input/output apparatus, the communication interface 1530, and the CD-ROM drive 1560 to the host controller 1582. The hard disk drive 1540 stores the programs and data used by the CPU 1505. The communication interface 1530 transmits and receives programs or data by connecting to the network communication apparatus 1598. The CD-ROM drive 1560 reads the programs and data from a CD-ROM 1595 and provides the read programs and data to the communication interface 1530 and to the hard disk drive 1540 via the RAM 1520.

Furthermore, the input/output controller 1584 is connected to the ROM 1510, and is also connected to the flexible disk drive 1550 and the input/output chip 1570 serving as a relatively low speed input/output apparatus. The ROM 1510 stores a boot program performed when the image capturing apparatus 100 starts up, a program relying on the hardware of the image capturing apparatus 100, and the like. The flexible disk drive 1550 reads programs or data from a flexible disk 1590 and supplies the read programs or data to the communication interface 1530 and the hard disk drive 1540 via the RAM 1520. The input/output chip 1570 is connected to a variety of input/output apparatuses via the flexible disk drive 1550, and a parallel port, a serial port, a keyboard port, a mouse port, or the like, for example.

A program executed by the CPU 1505 is provided by a user in a state where it is stored in a storage medium, such as the flexible disk 1590, the CD-ROM 1595, or an IC card. The program may be stored in the recording medium either in a decompressed condition or a compressed condition. The program is installed via the recording medium to the hard disk drive 1540, and is read by the RAM 1520 to be executed by the CPU 1505. The program executed by the CPU 1505 causes the image capturing apparatus 100 to function as: an image capturing section 105, an image processing section 140, a display 150, an image recording section 155, an optical characteristic specifying section 160, an optical characteristic storage 165, a frequency characteristic calculating section 170, a frequency component difference calculating section 172, a sum calculating section 174, an optical transfer function selecting section 176, a process parameter selecting section 180, a process parameter storage 185, a positional information obtaining section 190, a distance measuring section 192, a captured image analysis section 194, and an object region specifying section 196, explained in relation to FIGS. 1-15.

The programs shown above may be stored in an external storage medium. In addition to the flexible disk 1590 and the CD-ROM 1595, an optical recording medium such as a DVD or PD, a magnetooptical medium such as an MD, a tape medium, a semiconductor memory such as an IC card, or the like can be used as the recording medium. Furthermore, a storage apparatus such as a hard disk or a RAM disposed in a server system connected to a dedicated communication network or the Internet may be used as the storage medium and the programs may be provided to the image capturing apparatus 100 via the network.

Note that the image capturing apparatus 100 is taken as an example for explaining one embodiment of the innovations herein. However another embodiment may be an image processing apparatus for specifying the optical transfer function of the optical system 110. The image processing apparatus specifies the optical transfer function included in the image capturing apparatus 100 based on the image captured by the image capturing apparatus 100. The image processing apparatus specifically includes, from among the constituting elements of the image capturing apparatus 100, the image processing section 140, the display 150, the image recording section 155, the optical characteristic specifying section 160, the optical characteristic storage 165, the frequency characteristic calculating section 170, the frequency component difference calculating section 172, the sum calculating section 174, the optical transfer function selecting section 176, the process parameter selecting section 180, the process parameter storage 185, the positional information obtaining section 190, the captured image analysis section 194, and the object region specifying section 196. Note that the image processing apparatus may be provided independent from the image capturing apparatus 100, or installed within the image capturing apparatus 100 as described above as the embodiment.

Although some aspects of the present invention have been described by way of exemplary embodiments, it should be understood that those skilled in the art might make many changes and substitutions without departing from the spirit and the scope of the present invention which is defined only by the appended claims.

What is claimed is:

1. An image capturing apparatus for capturing an image of a subject, comprising:
   an optical system that causes a light receiving section of the image capturing apparatus to receive, in substantially the same spread, light from respective positions lying within a predetermined range of positional relation with respect to the image capturing apparatus, and has different optical transfer functions for light from different positions lying within the predetermined range of positional relation with respect to the image capturing apparatus;
   a process parameter storage that stores each process parameter for correcting the effect of an optical transfer function exerted on the captured image, in association with a condition related to a positional relation between a subject and the optical system, where the condition is to be satisfied in performing correction using the process parameter;

a positional information obtaining section that obtains positional information indicating a positional relation between a subject and the optical system; and a process parameter selecting section that selects a process parameter that is stored in the process parameter storage in association with a condition that the positional relation indicated by the positional information obtained by the positional information obtaining section satisfies; and wherein the positional information obtaining section receives a signal representing an instruction from a user in relation to a positional relation between a subject and the optical system, and obtains the signal as the positional information, the process parameter storage stores each process parameter for correcting the effect of the optical transfer function exerted on the captured image, in association with a condition related to an instruction obtained in capturing an image, where the condition is to be satisfied in performing correction using the process parameter, and the process parameter selecting section selects a process parameter that is stored in the process parameter storage in association with a condition that the instruction obtained by the positional information obtaining section satisfies, wherein the optical system causes the light receiving section to receive, in substantially the same spread, light from respective positions lying within a predetermined range of distance from the optical system, and has different optical transfer functions for light from different positions lying within the predetermined range of distance from the optical system, the process parameter storage stores each process parameter for correcting the effect of the optical transfer function exerted on the captured image, in association with a condition related to the distance from the optical system, where the condition is to be satisfied in performing correction using the process parameter, the positional information obtaining section obtains distance information indicating a distance between a subject and the optical system, and the process parameter selecting section selects a process parameter that is stored in the process parameter storage in association with a condition that the distance indicated by the distance information obtained by the positional information obtaining section satisfies; and further comprising:

an image processing section that corrects the effect of the optical transfer function exerted on the captured image, by using the process parameter selected by the process parameter selecting section, wherein the optical system has different optical transfer functions for light from positions lying within a predetermined range of distance from the optical system and having different distances from the optical system in an optical axis direction of the optical system and different positional relations with respect to the optical axis of the optical system, the process parameter storage stores each process parameter for correcting the effect of the optical transfer function exerted on each of image regions within the captured image, in association with a condition related to a distance of a subject captured in the image region in the optical axis direction, and with a condition related to a position of the image region in the captured image that corresponds to the positional relation with respect to the optical axis of the optical system, the positional information obtaining section obtains, for each image region, a distance between a captured subject and the optical system and the position of the image region in the captured image, as the positional information, the process parameter selecting section selects, for each image region, a process parameter that is stored in the process parameter storage in association with conditions that the distance from the optical system and the position of the image region obtained by the positional information obtaining section satisfy, and the image processing section corrects, for each image region, the effect of the optical transfer function exerted on the image region, by using the process parameter selected by the process parameter selecting section.

2. The image capturing apparatus as set forth in claim 1, wherein the optical system has different optical transfer functions for light from positions lying within the predetermined range of distance from the optical system and having different distances in the optical axis direction and different distances from the optical axis, the process parameter storage stores each process parameter for correcting the effect of the optical transfer function exerted on each image region within the captured image, in association with a condition related to a distance of a subject captured in the image region in the optical axis direction, and with a condition related to a distance of the image region from an optical axis point that is a point belonging to the optical axis on the captured image that corresponds to the distance of the subject captured in the image region from the optical axis, where the conditions are to be satisfied in performing correction using the process parameter, the positional information obtaining section obtains, for each image region, a distance between a captured subject and the optical system and a distance from the optical axis point, as the positional information, and the process parameter selecting section selects, for each image region, a process parameter that is stored in the process parameter storage in association with conditions that the distance from the optical system and the distance from the optical axis point obtained by the positional information obtaining section satisfy.

3. The image capturing apparatus as set forth in claim 2, wherein the optical system has different optical transfer functions for light from different positions lying within the predetermined range of distance from the optical system and having different distances from the optical system in the optical axis direction, different distances from the optical axis, and different angles around the intersection between the optical axis and a subject plane, the process parameter storage stores each process parameter for correcting the effect of the optical transfer function exerted on each image region within the captured image, in association with a condition related to the distance of the subject captured in the image region in the optical axis direction, with a condition related to a distance of the image region from the optical axis point, and with a condition related to an angle indicating a position of the image region around the optical axis point that corresponds to the angle around the intersection of the subject captured in the image region, where the conditions are to be satisfied in performing correction using the process parameter, the positional information obtaining section obtains, for each image region, the distance between the captured subject and the optical system, the distance from the optical axis point, and the angle around the optical axis point, as the positional information, and the process parameter selecting section selects, for each image region, a process parameter that is stored in the process parameter storage in association with conditions that the distance from the optical system, the distance from the optical axis point, and the angle around the optical axis point obtained by the positional information obtaining section satisfy.

4. The image capturing apparatus as set forth in claim 3, wherein the optical system causes the light receiving section to receive, in substantially the same spread, light from respective positions lying within a predetermined range of distance from the optical system, by means of transverse aberration.

5. The image capturing apparatus as set forth in claim 4, further comprising:

a distance measuring section that measures a distance up to a subject captured in each of a plurality of image regions, wherein the positional information obtaining section obtains, for each image region, the distance measured by the distance measuring section and a position of the image region in the captured image, as the positional information.

6. An image capturing apparatus for capturing an image of a subject, comprising:

an optical system that causes a light receiving section of the image capturing apparatus to receive, in substantially the same spread, light from respective positions lying within a predetermined range of positional relation with respect to the image capturing apparatus, and has different optical transfer functions for light from different positions lying within the predetermined range of positional relation with respect to the image capturing apparatus;

a process parameter storage that stores each process parameter for correcting the effect of an optical transfer function exerted on the captured image, in association with a condition related to a positional relation between a subject and the optical system, where the condition is to be satisfied in performing correction using the process parameter;

a positional information obtaining section that obtains positional information indicating a positional relation between a subject and the optical system; and a process parameter selecting section that selects a process parameter that is stored in the process parameter storage in association with a condition that the positional relation indicated by the positional information obtained by the positional information obtaining section satisfies; and wherein the positional information obtaining section receives a signal representing an instruction from a user in relation to a positional relation between a subject and the optical system, and obtains the signal as the positional information, the process parameter storage stores each process parameter for correcting the effect of the optical transfer function exerted on the captured image, in association with a condition related to an instruction obtained in capturing an image, where the condition is to be satisfied in performing correction using the process parameter, and the process parameter selecting section selects a process parameter that is stored in the process parameter storage in association with a condition that the instruction obtained by the positional information obtaining section satisfies, wherein the optical system causes the light receiving section to receive, in substantially the same spread, light from respective positions lying within a predetermined range of distance from the optical system, and has different optical transfer functions for light from different positions lying within the predetermined range of distance from the optical system, the process parameter storage stores each process parameter for correcting the effect of the optical transfer function exerted on the captured image, in association with a condition related to the distance from the optical system, where the condition is to be satisfied in performing correction using the process parameter, the positional information obtaining section obtains distance information indicating a distance between a subject and the optical system, and the process parameter selecting section selects a process parameter that is stored in the process parameter storage in association with a condition that the distance indicated by the distance information obtained by the positional information obtaining section satisfies; and further comprising:

an image processing section that corrects the effect of the optical transfer function exerted on the captured image, by using the process parameter selected by the process parameter selecting section, wherein the positional information obtaining section obtains an operational mode for dealing with a captured image resulting from capturing an image of a subject in a close-range mode or an operational mode for dealing with a captured image resulting from capturing an image of a subject in a long-range mode, as the positional information, the process parameter storage stores each process parameter for correcting the effect of the optical transfer function exerted on the captured image, in association with a condition related to an operational mode of the image capturing apparatus in dealing with a captured image to be corrected using the process parameter, and the process parameter selecting section selects a process parameter stored in the process parameter storage in association with a condition that the operational mode obtained by the positional information obtaining section satisfies.

7. The image capturing apparatus as set forth in claim 6, wherein the positional information obtaining section obtains an image capturing mode for capturing a subject in a close range, as the positional information, the process parameter storage stores each process parameter for correcting the effect of the optical transfer function exerted on the captured image, in association with an image capturing mode of the image capturing apparatus in capturing an image to be corrected using the process parameter, and the process parameter selecting section selects a process parameter stored in the process parameter storage in association with a condition that the image capturing mode obtained by the positional information obtaining section satisfies.

8. The image capturing apparatus as set forth in claim 6, further comprising:
a distance measuring section that measures a distance up to a subject, wherein
the positional information obtaining section obtains the distance measured by the distance measuring section,
the process parameter storage stores each process parameter for correcting the effect of the optical transfer function exerted on the captured image, in association with a condition related to a distance up to the subject to be satisfied in performing correction using the process parameter, and
the process parameter selecting section selects a process parameter that is stored in the process parameter storage in association with a condition that the distance obtained by the positional information obtaining section satisfies.

9. The image capturing apparatus as set forth in claim 6, wherein
the process parameter storage stores each process parameter for correcting the effect of the optical transfer function exerted on each of a plurality of image regions in the captured image, in association with conditions related to a direction of an optical axis of the optical system and the position of each image region in the captured image,
the positional information obtaining section obtains the direction of the optical axis of the optical system and the position of each image region in the captured image, as the positional information, and
the process parameter selecting section selects a process parameter that is stored in the process parameter storage in association with conditions that the direction of the optical axis of the optical system and the position of the each image region obtained by the positional information obtaining section satisfy.

10. The image capturing apparatus as set forth in claim 6, wherein
the optical axis of the optical system intersects with a light receiving surface of the light receiving section at an angle smaller than the right angle,
the process parameter storage stores each process parameter for correcting the effect of the optical transfer function exerted on each of a plurality of image regions in the captured image, in association with the conditions that the angle formed between the optical axis of the optical system and the light receiving surface of the light receiving section and the position of each of the plurality of image regions in the captured image satisfy,
the positional information obtaining section obtains the angle formed between the optical axis of the optical system and the light receiving surface of the light receiving section and the position of each of the plurality of image regions in the captured image, as the positional information, and
the process parameter selecting section selects a process parameter that is stored in the process parameter storage in association with conditions that the angle and the position of each of the plurality of image regions obtained by the positional information obtaining section satisfy.

11. An image capturing apparatus for capturing an image of a subject, comprising:
an optical system that causes a light receiving section of the image capturing apparatus to receive, in substantially the same spread, light from respective positions lying within a predetermined range of positional relation with respect to the image capturing apparatus, and has different optical transfer functions for light from different positions lying within the predetermined range of positional relation with respect to the image capturing apparatus;
a process parameter storage that stores each process parameter for correcting the effect of an optical transfer function exerted on the captured image, in association with a condition related to a positional relation between a subject and the optical system, where the condition is to be satisfied in performing correction using the process parameter;
a positional information obtaining section that obtains positional information indicating a positional relation between a subject and the optical system; and
a process parameter selecting section that selects a process parameter that is stored in the process parameter storage in association with a condition that the positional relation indicated by the positional information obtained by the positional information obtaining section satisfies; and wherein
the positional information obtaining section receives a signal representing an instruction from a user in relation to a positional relation between a subject and the optical system, and obtains the signal as the positional information,
the process parameter storage stores each process parameter for correcting the effect of the optical transfer function exerted on the captured image, in association with a condition related to an instruction obtained in capturing an image, where the condition is to be satisfied in performing correction using the process parameter, and
the process parameter selecting section selects a process parameter that is stored in the process parameter storage in association with a condition that the instruction obtained by the positional information obtaining section satisfies,
wherein
the optical system causes the light receiving section to receive, in substantially the same spread, light from respective positions lying within a predetermined range of distance from the optical system, and has different optical transfer functions for light from different positions lying within the predetermined range of distance from the optical system,
the process parameter storage stores each process parameter for correcting the effect of the optical transfer function exerted on the captured image, in association with a condition related to the distance from the optical system, where the condition is to be satisfied in performing correction using the process parameter,
the positional information obtaining section obtains distance information indicating a distance between a subject and the optical system, and
the process parameter selecting section selects a process parameter that is stored in the process parameter storage in association with a condition that the distance indicated by the distance information obtained by the positional information obtaining section satisfies; and
further comprising:
an image processing section that corrects the effect of the optical transfer function exerted on the captured image, by using the process parameter selected by the process parameter selecting section, further comprising;
a captured image analysis section that analyzes the image contents of the captured image, wherein the positional information obtaining section obtains an analysis result of the captured image analysis section, the process parameter storage stores each process parameter for correcting the effect of the optical transfer function exerted on the captured image, in association with a condition related to the image contents of the captured image to be satisfied in performing correction using the process parameter, and the process parameter selecting section selects a process parameter that is stored in the process parameter storage in association with a condition that the analysis result obtained by the positional information obtaining section satisfies.

12. An image capturing apparatus for capturing an image of a subject, comprising:

an optical system that causes a light receiving section of the image capturing apparatus to receive, in substantially the same spread, light from respective positions lying within a predetermined range of positional relation with respect to the image capturing apparatus, and has different optical transfer functions for light from different positions lying within the predetermined range of positional relation with respect to the image capturing apparatus;

a process parameter storage that stores each process parameter for correcting the effect of an optical transfer function exerted on the captured image, in association with a condition related to a positional relation between a subject and the optical system, where the condition is to be satisfied in performing correction using the process parameter;

a positional information obtaining section that obtains positional information indicating a positional relation between a subject and the optical system; and a process parameter selecting section that selects a process parameter that is stored in the process parameter storage in association with a condition that the positional relation indicated by the positional information obtained by the positional information obtaining section satisfies; and wherein the positional information obtaining section receives a signal representing an instruction from a user in relation to a positional relation between a subject and the optical system, and obtains the signal as the positional information, the process parameter storage stores each process parameter for correcting the effect of the optical transfer function exerted on the captured image, in association with a condition related to an instruction obtained in capturing an image, where the condition is to be satisfied in performing correction using the process parameter, and the process parameter selecting section selects a process parameter that is stored in the process parameter storage in association with a condition that the instruction obtained by the positional information obtaining section satisfies, wherein the process parameter storage stores each process parameter for correcting the effect of the optical transfer function exerted on each of a plurality of image regions in the captured image, in association with the position of each image region in the captured image, the positional information obtaining section obtains the position of each image region in the captured image, as the positional information, and the process parameter selecting section selects a process parameter that is stored in the process parameter storage in association with a condition that the position of the each image region obtained by the positional information obtaining section satisfies.

13. A method for capturing an image using an optical system that causes a light receiving section of an image capturing apparatus to receive, in substantially the same spread, light from respective positions lying within a predetermined range of positional relation with respect to the image capturing apparatus, and has different optical transfer functions for light from different positions lying within the predetermined range of positional relation with respect to the image capturing apparatus, the image capturing apparatus capturing an image of a subject, the image capturing method comprising:

storing each process parameter for correcting the effect of an optical transfer function exerted on the captured image, in association with a condition related to a positional relation between a subject and the optical system, where the condition is to be satisfied in performing correction using the process parameter;

obtaining positional information indicating a positional relation between a subject and the optical system; and selecting a process parameter that is stored in the process parameter storing in association with a condition that the positional relation indicated by the positional information obtained in the positional information obtaining satisfies; and wherein the positional information obtaining comprises receiving a signal representing an instruction from a user in relation to a positional relation between a subject and the optical system, and obtaining the signal as the positional information, the process parameter storing stores each process parameter for correcting the effect of the optical transfer function exerted on the captured image, in association with a condition related to an instruction obtained in capturing an image, where the condition is to be satisfied in performing correction using the process parameter, and the process parameter selecting selects a process parameter that is stored in the process parameter storage in association with a condition that the instruction obtained by the positional information obtaining section satisfies, wherein the optical system causes the light receiving section to receive, in substantially the same spread, light from respective positions lying within a predetermined range of distance from the optical system, and has different optical transfer functions for light from different positions lying within the predetermined range of distance from the optical system, the process parameter storing stores each process parameter for correcting the effect of the optical transfer function exerted on the captured image, in association with a condition related to the distance from the optical system, where the condition is to be satisfied in performing correction using the process parameter, the positional information obtaining obtains distance information indicating a distance between a subject and the optical system, and the process parameter selecting selects a process parameter that is stored in the process parameter storage in association with a condition that the distance indicated by the distance information obtained by the positional information obtaining; and further comprising:

an image processing that corrects the effect of the optical transfer function exerted on the captured image, by using the process parameter selected by the process parameter selecting, wherein the positional information obtaining obtains an operational mode for dealing with a captured image resulting from capturing an image of a subject in a close-range mode or an operational mode for dealing with a captured image resulting from capturing an image of a subject in a long-range mode, as the positional information, the process parameter storing stores each process parameter for correcting the effect of the optical transfer function exerted on the captured image, in association with a condition related to an operational mode of the image capturing apparatus in dealing with a captured image to be corrected using the process parameter, and the process parameter selecting selects a process parameter stored in the process parameter storage in association with a condition that the operational mode obtained by the positional information obtaining section satisfies.

14. A non-transitory computer readable medium including a program for an image capturing apparatus for capturing an image of a subject, the image capturing apparatus including an optical system that causes a light receiving section of the image capturing apparatus to receive, in substantially the same spread, light from respective positions lying within a predetermined range of positional relation with respect to the image capturing apparatus, and has different optical transfer functions for light from different positions lying within the predetermined range of positional relation with respect to the image capturing apparatus, the computer readable media causing, by means of execution of the program, a computer to function as:

a process parameter storage that stores each process parameter for correcting the effect of an optical transfer function exerted on the captured image, in association with a condition related to a positional relation between a subject and the optical system, where the condition is to be satisfied in performing correction using the process parameter;

a positional information obtaining section that obtains positional information indicating a positional relation between a subject and the optical system; and a process parameter selecting section that selects a process parameter that is stored in the process parameter storage in association with a condition that the positional relation indicated by the positional information obtained by the positional information obtaining section satisfies; and wherein the positional information obtaining section receives a signal representing an instruction from a user in relation to a positional relation between a subject and the optical system, and obtains the signal as the positional information, the process parameter storage stores each process parameter for correcting the effect of the optical transfer function exerted on the captured image, in association with a condition related to an instruction obtained in capturing an image, where the condition is to be satisfied in performing correction using the process parameter, and the process parameter selecting section selects a process parameter that is stored in the process parameter storage in association with a condition that the instruction obtained by the positional information obtaining section satisfies, wherein the optical system causes the light receiving section to receive, in substantially the same spread, light from respective positions lying within a predetermined range of distance from the optical system, and has different optical transfer functions for light from different positions lying within the predetermined range of distance from the optical system, the process parameter storage stores each process parameter for correcting the effect of the optical transfer function exerted on the captured image, in association with a condition related to the distance from the optical system, where the condition is to be satisfied in performing correction using the process parameter, the positional information obtaining section obtains distance information indicating a distance between a subject and the optical system, and the process parameter selecting section selects a process parameter that is stored in the process parameter storage in association with a condition that the distance indicated by the distance information obtained by the positional information obtaining section satisfies; and further comprising:

an image processing section that corrects the effect of the optical transfer function exerted on the captured image, by using the process parameter selected by the process parameter selecting section, wherein the positional information obtaining section obtains an operational mode for dealing with a captured image resulting from capturing an image of a subject in a close-range mode or an operational mode for dealing with a captured image resulting from capturing an image of a subject in a long-range mode, as the positional information, the process parameter storage stores each process parameter for correcting the effect of the optical transfer function exerted on the captured image, in association with a condition related to an operational mode of the image capturing apparatus in dealing with a captured image to be corrected using the process parameter, and the process parameter selecting section selects a process parameter stored in the process parameter storage in association with a condition that the operational mode obtained by the positional information obtaining section satisfies.

* * * * *